(12) United States Patent
Mufti

(10) Patent No.: US 10,013,990 B2
(45) Date of Patent: *Jul. 3, 2018

(54) MEDIA CONTENT MARKING AND TRACKING METHODS AND APPARATUS

(71) Applicant: Sparcq, Inc., Tustin, CA (US)

(72) Inventor: Mohammed Umair Mufti, Tustin, CA (US)

(73) Assignee: SPARCQ, INC., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,485

(22) Filed: Jan. 30, 2017

(65) Prior Publication Data

US 2017/0140766 A1 May 18, 2017

Related U.S. Application Data

(63) Continuation of application No. 14/611,754, filed on Feb. 2, 2015, now Pat. No. 9,558,751.

(Continued)

(51) Int. Cl.
*G06F 17/00* (2006.01)
*G10L 19/018* (2013.01)
(Continued)

(52) U.S. Cl.
CPC ...... *G10L 19/018* (2013.01); *G06F 17/30743* (2013.01); *H04N 21/233* (2013.01);
(Continued)

(58) Field of Classification Search
CPC ...... G06Q 30/00; G06Q 30/02; G10L 19/018; H04N 21/235; H04N 21/435;
(Continued)

(56) References Cited

U.S. PATENT DOCUMENTS 9,558,751 B2 * 1/2017 Mufti ............... G10L 19/018
2006/0252420 A1 11/2006 Mantravadi et al.
(Continued)

OTHER PUBLICATIONS

International Search Report and Written Opinion dated May 11, 2015 for International PCT Application No. PCT/US2015/014078.
(Continued)

*Primary Examiner* — Andrew C Flanders
(74) *Attorney, Agent, or Firm* — K&L Gates LLP

(57) ABSTRACT

A system, method, and apparatus for media content marking and tracking are disclosed. An example method includes determining an identification code responsive to a request from a third-party client, generating an audio file including the identification code, transmitting the audio file to the third-party client enabling the third-party client to embed the audio file including the identification code into media content, receiving content information associated with the media content from the third-party client, storing the content information in correspondence to a stored copy of the identification code, receiving a message including the identification code from a consumer device that detected the identification code within the media content, determining the identification code corresponds to the content information, transmitting the content information to the consumer device, receiving an event from the consumer device based on the content information, and making data associated with the event graphically available for the third-party client.

21 Claims, 13 Drawing Sheets

Related U.S. Application Data

(60) Provisional application No. 61/934,183, filed on Jan. 31, 2014.

(51) Int. Cl.
*H04N 21/431* (2011.01)
*H04N 21/8358* (2011.01)
*G06F 17/30* (2006.01)
*H04N 21/233* (2011.01)
*H04N 21/439* (2011.01)
*H04N 21/8352* (2011.01)
*H04N 21/858* (2011.01)

(52) U.S. Cl.
CPC ..... *H04N 21/4316* (2013.01); *H04N 21/4394* (2013.01); *H04N 21/8352* (2013.01); *H04N 21/8358* (2013.01); *H04N 21/8586* (2013.01)

(58) Field of Classification Search
CPC ......... H04N 21/8358; H04N 21/23614; H04N 21/4316; H04N 21/4348; H04N 21/475; G11B 20/00884; H04L 67/22; G06F 17/30743; G06F 17/30746; G06F 17/30749
See application file for complete search history.

(56) References Cited

U.S. PATENT DOCUMENTS

| | | |
|---|---|---|
| 2008/0027734 A1 | 1/2008 | Zhao et al. |
| 2008/0255944 A1 | 10/2008 | Shah et al. |
| 2010/0185502 A1 | 7/2010 | Roberts et al. |
| 2013/0297727 A1 | 11/2013 | Levy |

OTHER PUBLICATIONS

International Preliminary Report on Patentability dated Aug. 2, 2016 for International PCT Application No. PCT/US2015/014078.

\* cited by examiner

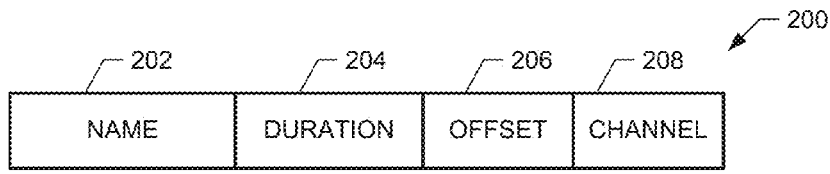

FIG. 2

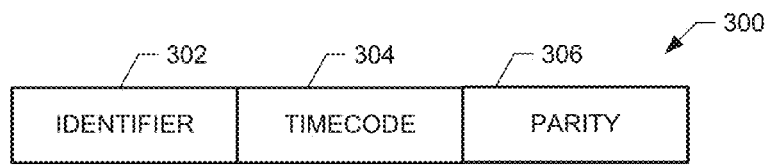

FIG. 3

| ID Code | Content Information | Send to Consumer Device | Active | Requestor |
|---------|---------------------|-------------------------|--------|-----------|
| ACB3341R | 12.4434/2256-90C2-8921-3W1P-LK90-1 | N | Y | Content Creator 1 |
| ACD3341S | www.contentsite.com | Y | Y | Content Creator 1 |
| ACE6HI0P | Promo Code: 455 | Y | N | Content Creator 1 |
| C3499LCF | LDFC-JJEW-9ICF-12WD | N | Y | Ad Creator 1 |
| 9FD6R7N8 | First Run 1/16/2014 | N | Y | Broadcaster 1 |
| 9FE76RVC | Second Run 1/18/2014 | N | Y | Broadcaster 1 |

FIG. 5

| ID Code | Content Information | Send to Consumer Device | Active | Requestor |
|---------|---------------------|-------------------------|--------|-----------|
| ACB3341R | 12.4434/2256-90C2-8921-3W1P-LK90-1 | N | Y | Content Creator 1 |
| ACD3341S | www.contentsiteupdate.com | Y | Y | Content Creator 1 |
| ACE6HI0P | Promo Code: 534 | Y | N | Content Creator 1 |
| C3499LCF | GVFC-56EW-9I54-12WD | N | Y | Ad Creator1 |
| 9FD6R7N8 | Second Run 1/18/2014 Show 1 | N | Y | Broadcaster 1 |
| 9FE76RVC | First Run 1/20/2014 Show 2 | N | Y | Broadcaster 1 |

FIG. 6

| Channel | Frequency range |
|---|---|
| -10 | 15 – 15.2 kHz |
| -9 | 15.2 – 15.4 kHz |
| -8 | 15.4 – 15.6 kHz |
| -7 | 15.6 – 15.8 kHz |
| -6 | 15.8 – 16 kHz |
| -5 | 16 – 16.2 kHz |
| -4 | 16.2 – 16.4 kHz |
| -3 | 16.4 – 16.6 kHz |
| -2 | 16.6 – 16.8 kHz |
| -1 | 16.8 – 17 kHz |
| 1 | 17 – 17.2 kHz |
| 2 | 17.2 – 17.4 kHz |
| 3 | 17.4 – 17.6 kHz |
| 4 | 17.6 – 17.8 kHz |
| 5 | 17.8 – 18 kHz |
| 6 | 18 – 18.2 kHz |
| 7 | 18.2 – 18.4 kHz |
| 8 | 18.4 – 18.6 kHz |
| 9 | 18.6 – 18.8 kHz |
| 10 | 18.8 – 19 kHz |
| 11 | 19 – 19.2 kHz |
| 12 | 19.2 – 19.4 kHz |
| 13 | 19.4 – 19.6 kHz |
| 14 | 19.6 – 19.8 kHz |
| 15 | 19.8 – 20 kHz |
| 16 | 20 – 20.2 kHz |
| 17 | 20.2 – 20.4 kHz |
| 18 | 20.4 – 20.6 kHz |
| 19 | 20.6 – 20.8 kHz |
| 20 | 20.8 – 21 kHz |
| 21 | 21 – 21.2 kHz |
| 22 | 21.2 – 21.4 kHz |
| 23 | 21.4 – 21.6 kHz |
| 24 | 21.6 – 21.8 kHz |
| 25 | 21.8 – 22 kHz |

FIG. 17

MEDIA CONTENT MARKING AND TRACKING METHODS AND APPARATUS

PRIORITY CLAIM

The present application is a continuation of and claims priority to and the benefit of U.S. patent application Ser. No. 14/611,754, now U.S. Pat. No. 9,558,751, filed on Feb. 2, 2015, which claims priority to and the benefit of U.S. Provisional Application Ser. No. 61/934,183, filed on Jan. 31, 2014, the entirety of which are incorporated herein by reference.

BACKGROUND

Media content such as television programs, movies, radio programs, music services, web programs, and advertisements may sometimes include an embedded identification code (e.g., an audio watermark) to track which consumers viewed and/or heard the content. Oftentimes the identification code includes information identifying the media content (e.g., an Entertainment Identifier Registry ("EIDR") or an Ad-ID). Alternatively, the identification code includes content information that a consumer may use to access a website, participate in a promotion, or receive a coupon. Presently, identification codes are embedded within audio by media content producers or content providers (e.g., distributors, broadcasters, etc.). The identification code is usually modulated within the media content at a frequency that is inaudible by humans. Specialized decoding devices are configured to detect the embedded code and transmit the code to a monitoring entity. The monitoring entity aggregates detected codes and reports this information to the media content producers and/or media content providers.

Currently, the media content producer or content provider is responsible for generating and managing identification codes. However, the monitoring entity is responsible for reporting the detection of identification codes. The separation between the monitoring entity and the content producer/provider may reduce the effectiveness of identification codes or increase the complexity of managing identification codes. For instance, content providers or producers that want to use identification codes generate an identification code and modulate the code into the content. However, not all content providers or producers have an ability or capability of generating identification codes. Moreover, some content providers/producers prefer not having to manage generated identification codes. Further, as standards for identification codes change, the content providers and content producers have to update their systems accordingly.

Additionally, the current framework for generating and detecting identification codes is relatively static. As discussed above, an identification code may include content information for a consumer. A provider of the content information may not easily change the information after the information is embedded within the media content without altering the information within the media content. For instance, a provider may not easily change a hyperlink to a webpage (used by a detection device to access the webpage after detecting the corresponding identification code) after the hyperlink has been embedded within the media content. Additionally, the provider may not easily change how the media content is identified after, for example, an Ad-ID is embedded within the media content. A need accordingly exists for dynamic management and tracking of media content.

SUMMARY

The present disclosure provides a new and innovative system, method, and apparatus for marking and tracking identification codes within media content. The example identification code service provides a framework for the dynamic creation and management of identification codes by adding a layer of abstraction regarding content identification. The identification code service provides relatively low-data identification codes that reference relatively high-data content information, which is available to content producers and/or content providers (e.g., third-party clients). This configuration enables content information to be changed even after an identification code has been embedded into media content. This configuration may advantageously support all present and future industry standards for media content identification because the standardized codes are stored as content information separate from the media content. The identification code also enables any content producer and/or content provider to use identification codes regardless of their technological capabilities or sophistication.

In an example embodiment, an example identification code service is configured to determine identification code(s) for a third-party client (e.g., any entity that is associated with the creation, production, distribution, broadcast, or transmission of media content), encode the identification code(s) into an audio file, and transmit or otherwise provide the audio file to the third-party client, which embeds the audio file into media content. Alternatively, the identification code service may be configured to embed the audio file with the identification code(s) into the media content.

The example identification code service is also configured to provide a database of created or determined identification codes that is accessible to third-party clients. A third-party client may access this database to associate content information with a created or determined identification code. The content information may include any type of industry standard for describing media content, general descriptions of media content, information for a consumer, and/or a file for a consumer. The third-party client may access the database as needed to update or change the content information as the need arises.

The example identification code service is further configured to provide consumer devices with an application configured to detect and decode identification codes within media content. The identification code service receives indications from a consumer device of a detection including the identification code. The identification code service may provide the consumer device with content information associated with the detected code, receive an event from a consumer device based on the identification code or content information, generate an event based on the detected identification code, and/or provide a third-party client with a graphical representation of data associated with the event aggregated with data from other similar events.

Additional features and advantages of the disclosed system, method, and apparatus are described in, and will be apparent from, the following Detailed Description and the Figures.

BRIEF DESCRIPTION OF THE FIGURES

FIG. 2 shows a diagram of an example data structure that may store identification code parameters provided by a third-party client, according to an example embodiment of the present disclosure.

FIG. 3 shows a diagram of an example identification code, according to an example embodiment of the present disclosure.

FIGS. 5 and 6 show respective data structures of identification codes and content information, according to an example embodiment of the present disclosure.

FIG. 17 shows a diagram of example frequency ranges for different channels of modulated identification codes, according to an example embodiment of the present disclosure.

DETAILED DESCRIPTION

Figure 1:
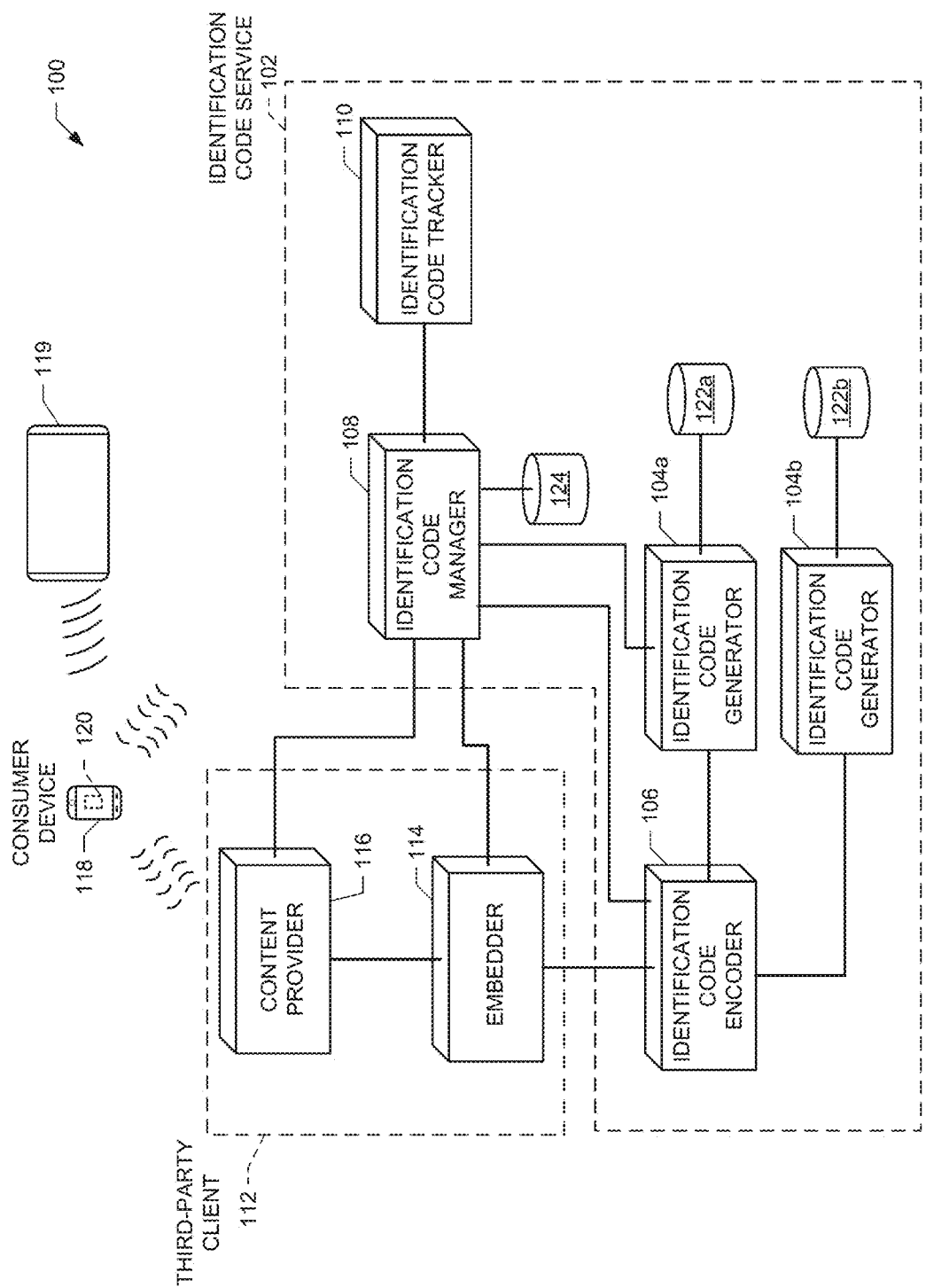
FIG. 1 shows a block diagram of an example identification code management environment, according to an example embodiment of the present disclosure.

The present disclosure relates in general to a method, apparatus, and system for managing media content identification codes and, in particular, to providing dynamic generation, management, and tracking of one or more identification codes embedded within media content. Briefly, in an example embodiment, a system is provided that generates, manages, and tracks identification codes (e.g., whistles) in media content. The example system includes a component that is configured to generate identification codes in response to a request from a third-party client (e.g., a content producer, content distributor, service provider, etc.). The example system also includes a component configured to modulate or encode generated identification code(s) within an audio file and transmit the audio file to a requesting third-party client. The example system enables the third-party client to incorporate the audio file within an audio track of media content. Alternatively, the system includes a component to embed the audio file with the identification code(s) into media content provided by a third-party client. The example system also provides consumer devices with an application, software, routine, algorithm, etc. configured to detect identification code(s) within the media content.

The example system further includes a component for managing and tracking identification codes. For instance, the example system stores identification codes to a database that is accessible by third-party clients. The system is configured to receive content information from third-party clients and associate the content information with the appropriate identification codes. The system is configured to receive from consumer devices (or upstream media content distribution components) a message including a detected identification code. Responsive to receiving the messages, the example system is configured to transmit associated content information to the consumer devices (or upstream components), receive one or more events from the consumer devices associated with content information, generate one or more events associated with the detection, and/or make available to the third-party clients a graphical representation of data associated with generated events.

As discussed herein, media content includes any audio/visual presentation. The media content may be pre-recorded and edited and/or created in real-time. For example, media content may include a television program, a news broadcast, a sporting event, a movie, a video-on-demand, music, video clip, etc. The media content may be provided to a consumer via a television cable service, a satellite television service, a radio broadcaster, a television broadcaster, an Internet service provider, a web service provider, etc. The media content may be played by a consumer upon receiving the content or may be stored to a storage medium for play at a later time. Further, while the disclosed system embeds an audio file with one or more identification codes into an audio track of media content, the media content does not necessarily need to have human-decipherable audio (e.g., only video/pictures). In these instances, the audio track provided in conjunction with the video includes only the audio file with the one or more identification codes.

Additionally, as discussed herein, media content information (or content information) includes data specified by a third-party client that describes or is otherwise associated with media content presented to a consumer. For example, content information can include an industry standard code for identifying media content such as an Entertainment Identifier Registry ("EIDR") or an Ad-ID. The content information can also include a description of the media content (e.g., a title, synopsis, characters, date, time, etc.) determined by a third-party client.

The content information may also include data specified by a third-party client to be transmitted to a consumer device responsive to that device detecting a corresponding identification code. For example, the content information may include a hyperlink that causes a receiving consumer device to navigate to a corresponding webpage. The content information may also include a promotional code, an advertisement, a coupon, a file, etc. The content information may further include metadata associated with the media content. It should be appreciated that content information may include any type of information or data provided by a third-party client and is not limited in size, scope, or application.

Reference is also made herein to events. As discussed in more detail below, an event is an indication of a detection of an identification code that is used by the example system to track or monitor identification code detection among a plurality of consumers and/or upstream components. An event is also an indication of an action performed by a consumer using content information provided by the example system in response to detecting an identification code. An event may include, the detected identification code, a time/date of the detection, and/or consumer information associated with the consumer device that made the detection. The event may also include content information and/or feedback provided by a consumer device of an action performed using the content information.

An event may be generated by a consumer device based on content information received from the example system. An event may also be generated upstream by, for example, media content distribution devices, network routers, broadcasting equipment, etc. For example, ingest or playout servers or set-top boxes may generate an event after detecting an identification code. In some examples, these upstream components may transmit detected identification codes to the example service, which then provides the upstream components corresponding content information. The upstream components may then generate events for the example system based on the received content information.

The example system is configured to analyze data within aggregated events for each of the different identification codes. The analysis may determine or rank detections based on demographic characteristics, geographic location, consumer device type, date/time of detection, etc. The example system provides a third-party client associated with the detected identification code (or other third-parties that subscribe to the example service) access to the analyzed information including, for example, a report of analyzed data, a data structure of events and associated analyzed data, and/or a graphical indication of analyzed data associated with the events that is provided by a web service updated in real-time as events are received and/or identification codes are detected.

Throughout the disclosure, reference is made to third-party clients. As disclosed below, third-party clients are entities that generate, edit, broadcast, distribute, or are otherwise involved in the creation and/or delivery of media content to consumers (e.g., end users). For example, a third-party client may include a producer of a television show, a producer of an advertisement, or a producer of Internet content. A third-party client may also include a television broadcaster (e.g., CNN, NBC, ESPN, etc.) or music service provider (e.g., Muzak, Pandora, etc.). A third-party client may further include a distributor (e.g., Sony Entertainment, NBCUniversal Television Distribution, Warner Brothers Television Distribution, etc.). Moreover, a third-party client may include a service provider (e.g., Time Warner, Xfinity, AT&T, Verizon, etc.).

The disclosed system may be readily realized in an identification code management environment. FIG. 1 illustrates a block diagram of an identification code management environment 100 that includes an identification code service 102. As described herein, the identification code service 102 includes one or more servers configured to generate identification codes, encode identification codes within audio files, manage identification codes, and provide tracking of identification codes. The example identification code service 102 may be cloud-based to further provide dynamic management and tracking of identification codes in substantially real-time. As shown in FIG. 1, the different functions of the identification code service 102 may be distributed among different servers such that an identification code generator 104 is configured to determine or create identification codes, an identification code encoder 106 is configured to encode identification codes into audio files, an identification code manager 108 is configured to enable third-party clients to manage identification codes, and an identification code tracker 110 is configured to provide tracking of identification codes for third-party clients.

In other embodiments, the functionality of one or more of the components 104-110 may be combined. For instance, the identification code generator 104 and the identification code encoder 106 may be combined to generate and encode identification codes. Alternatively, some of the functionality of the one or more servers 104-110 may be located at a third-party client 112. For instance, a third-party client 112 may have a separate identification code encoder 106 to encode and embed identification codes specifically for the third-party client 112 into media content.

As mentioned, the environment 100 of FIG. 1 includes third-party clients 112, which include an embedder 114 and a content provider 116. The example embedder 114 is configured to combine an audio file with an identification code into media content. The embedder 114 may be operated by a creator, editor, or producer of media content. The embedder 114 may also be operated by a downstream entity such as a distributor, broadcaster, and/or service provider.

The example content provider 116 is configured to transmit media content including one or more embedded identification codes to consumer devices 118. The content provider 116 may be operated by any Internet, cable, satellite, or wireless entity that provides infrastructure for the transmission of media content to endpoint consumer devices 118 and/or presentation devices 119. The content provider 116 may also be operated by any broadcaster and/or distributor that receives media content embedded with an identification code from an upstream producer and/or creator.

It should be appreciated that FIG. 1 includes only one third-party client 112 for brevity. In other examples, more than one third-party client 112 may be communicatively coupled to the identification code service 102 via the Internet or other network connection. Moreover, FIG. 1 shows the third-party client 112 as including both the embedder 114 and the content provider 116. In other examples, a third-party client (e.g., a media content producer) may only include an embedder 114 and rely on a separate content provider 116 (e.g., a service provider or a broadcaster) to transmit the media content to the consumer device 118 and/or presentation device 119. In yet other examples, the embedder 114 and/or the content provider 116 may be included within the identification code service 102.

The example consumer device 118 and presentation device 119 include any electronic device capable of presenting audio and/or video to a consumer. For example, the consumer device 118 can include any cellphone, smartphone, personal digital assistant ("PDA"), mobile device, tablet computer, computer, laptop, server, processor, console, gaming system, speaker system, multimedia receiver, etc. The example consumer device 118 includes an application 120 (provided by the identification code service 102) configured to detect identification codes embedded within media content. The example application 120 may use a microphone within the consumer device 118 to identify identification codes within audio media content played by the consumer device 118 and/or a presentation device 119 that is in proximity to the consumer device 118. Responsive to detecting one or more identification codes, the application 120 transmits a message including the detected identification codes via the consumer device 118 to the identification code manager 108, which notes the detection as an event.

The following sections describe each of the components of the identification code management environment 100 in more detail.

Identification Code Generator

The example identification code generator 104 is configured to determine or create identification codes for third-party clients. The identification code generator 104 provides an interface (e.g., an application programmable interface ("API")) that enables third-party clients to request an identification code and/or an audio file that includes an identification code. The interface is configured to prompt third-party clients for parameters for generating and encoding an identification code within an audio file (via the identification code encoder 106). The interface may enable a third-party client to request multiple identification codes for the same or different media content. To facilitate the request of multiple identification codes, the interface may include a feature that enables the third-party client to specify how many identification codes are to be included within each audio file and/or how many identification codes are to be included for each different media content. The interface may be provided by, for example, the identification code generator 104 to prompt third-party clients for information to create identification codes.

The user interface enables a third-party client to specify whether the media content will be provided to the identification code service 102, whether the third-party client will embed an audio file with an identification code into media content, and/or whether the third-party client will encode and identification code into an audio file and embed the audio file into media content. It should be appreciated that the identification code service 102 operates the identification code encoder 106 and/or the embedder 114 based on the information provided by the third-party client. For instance, while not shown in FIG. 1, the identification code service 102 may use the embedder 114 responsive to a third-party client providing the media content to the identification code service 102 (e.g., a third-party selecting to upload an image, upload a video, upload music, or upload a file). In this manner, the identification code service 102 is configured to provide third-party clients per request either an identification code, an audio file including an encoded identification code, and/or media content including an embedded and encoded identification code.

In alternative embodiments, the interface (e.g., the API) may be hosted by the identification code manager 108. In these embodiments, the identification code manager 108 receives the requests for identification codes from the third-party client 112. The identification code manager 108 instructs the identification code generator 104 to generate an identifier for an identification code. The identification code manager 108 also instructs the identification code encoder 106 to generate an audio file including one or more identification codes (using the generated identifier) based on the parameters provided by the third-party client 112. In these alternative embodiments, the identification code manager 108 may also instruct the embedder 114 to embed an audio file including an identification code into media content provided by a third-party client 112.

FIG. 2 shows a diagram of an example data structure 200 that may store identification code parameters provided by a third-party client. The data structure 200 includes fields for a requestor name 202 (e.g., an identifier of a requesting third-party client), a duration during which an identification code (or an identifier of an identification code) is to be repeated within an audio file 204, an offset 206 specifying a start of a timecode, and a frequency band or channel (or center frequency) in which the identification code is to be modulated within an audio file 208. In some examples, the requestor identifier 202 may be omitted or replaced with a field for an identification code after the code is generated. It should be appreciated that the data structure 200 may include additional fields including, for example, a media content type, requester type, duration of audio file, or a link to the media content (e.g., when the third-party client requests that the identification code service 102 embed the audio file into media content).

Responsive to receiving a request for an identification code, the example identification code generator 104 determines an identifier for an identification code. The identification code encoder 106 determines a timecode and parity bits for an identification code. As shown in FIG. 3, an example identification code 300 (e.g., a whistle) includes an identifier field 302, a timecode field 304, and a parity field 306 (for forward error correction). The identifier includes a unique code that the identification code generator 104 determines from among a subset of available unique codes. To determine the unique code, the identification code generator 104 generates a random number from among the available unique codes and converts that number into, for example, a base64url-encoded string of 8 characters.

In an embodiment, the identification code generator 104 is part of a Representation State Transfer ("RESTful") web service (and/or a Broadcast Exchange Format ("BXF")) that includes other geographically distributed identification code generators 104. In this embodiment, each of the identification code generators 104 is assigned a subset of identifiers. For example, the identification code generator 104a may be assigned a first subset of identifiers, which are stored in database 122a and the identification code generator 104b may be assigned a second subset of identifiers, which are stored in database 122b. The routing of requests from a third-party client to the identification code generators 104 may be based on, for example, geographic proximity, network conditions, third-party type, etc. For example, the identification code service 102 may be configured such that requests from content producers are routed to the identification code generator 104a while requests from broadcasters are routed to the identification code generator 104b. In this manner third-party clients of the same type are assigned identification code from the same subset, thereby making identification code management more efficient.

Identification Code Encoder

The example identification code encoder 106 is configured to determine a timecode and parity bits for an identification code based on an identifier (and/or third-party specified parameters) provided by the identification code generator 104. In other examples, the identification code encoder 106 may also determine a version identifier for an identification code. The example identification encoder is also configured to modulate identification codes into an audio file. The example identification code encoder 106 may operate within a RESTful web service that provides distributed (or cloud-based) encoding for third-party clients. Alternatively, the identification code encoder 106 may be implemented on a client server or processor. In this alternative example, the identification code encoder 106 may be configured to operate across different media platforms.

Returning to FIG. 3, the example timecode field is configured to store a timer value based how many times an identifier is to be repeated within an audio file. As discussed above in conjunction with FIG. 2, a third-party client may specify a duration for an audio file during which an identifier is repeated. The timecode field is used as a sequential counter to identify a position of an identification code within an audio file. The use of a timecode enables, for example, the identification code manager 108 to determine which specific portion (and/or how much) of media content was detected.

For example, a third-party client may specify that an identification code is to be repeated every second for 30 seconds. For this request, the identification code generator 104 determines a single identifier. The identification code encoder 106 then creates 30 identification codes with the same identifier and a different timecode based on a position of the identification code with the 30 second audio file. Thus, the first identification code may include a timecode of 0 while the last identification code may include a timecode of 30. Accordingly, as referenced herein, an audio file that includes an identification code that is repeated for a duration may include many different identification codes with the same identifier and a different timecode.

In an example implementation, the identifier field is 48 bits, the timecode field is 18 bits, and the parity field is 66 bits. In this example implementation, approximately 280 trillion unique identifiers are possible. This enables the identification codes to be used as dynamic short-lived codes, which may obfuscate managed codes such as, for example, EIDRs and Ad-IDs. The use of these short-lived identification codes can enhance security and provide an additional layer of functionality built on top of managed codes. For example, a television commercial with a single Ad-ID (e.g., content information) might include different identification codes for each station to which the ad is distributed. The use of these different identification codes provides more visibility regarding the number of views of the ad per station for the advertiser.

The example identification code encoder 106 encodes an identification code according to, for example, a Society of Motion Picture and Television Engineers ("SMPTE") standard or Coalition for Innovative Media Measurement ("CIMM") standard. The identification code encoder 106 uses a modulation technique that utilizes multiple carriers in concert with low symbol rates. The modulation technique, especially when combined with forward error correction, provides identification codes that are robust against data corruption.

In an example implementation, the identification code encoder 106 modulates identification codes in an audio file to have a data rate of 264 bits per second, thereby using no more than 200 Hz of bandwidth. The identification code encoder 106 may modulate the identification codes using, for example, coded orthogonal frequency-division multiplexing ("COFDM"), which uses multiple subcarriers that each pass a portion of an identification code. The identification code encoder 106 may modulate each subcarrier using a separate modulation method. For example, the identification code encoder 106 may modulate one or more subcarriers using differential quadrature phase-shift keying ("DQPSK") with Gray coding. The identification code encoder 106 may also modulate subcarriers using frequency-shift keying ("FSK"), amplitude-shift keying ("ASK"), quadrature amplitude modulation ("QAM"), etc.

In the example implementation, the identification code encoder 106 separates each subcarrier by 8 Hz. In other examples, the separation may be lesser or greater than 8 Hz (e.g., 2 Hz, 20 Hz, 50 Hz, etc.). In this example implementation, the identification code encoder 106 is configured to use 22 subcarriers for a total bandwidth usage of 168 Hz. In other examples, fewer or additional subcarriers may be used, thereby changing the bandwidth usage. The identification code encoder 106 may also use additional subcarriers for synchronization and/or to provide a guard band, thereby increasing the bandwidth usage.

Further, in this example implementation, the identification code encoder 106 may configure a baud rate for each subcarrier to be six symbols per second with each symbol including two bits of the identification code. The combined bit rate of an embedded identification code is accordingly 264 bits per second. As discussed above, each identification code includes 132 bits of data (48 bits for the identifier, 18 bits for the timecode, and 66 parity bits). This configuration enables the identification code encoder 106 to encode two identification codes per second.

In addition to modulating identification codes into an analog signal, the example identification code encoder 106 is configured to generate an audio file based on information (e.g., duration, offset, channel) provided by the third-party client. For example, the identification code encoder 106 generates an audio file of a specified length in seconds based on a duration provided by the third-party client. The duration may be as short as one second and a long as three days.

As discussed above, the identification code encoder 106 creates identification codes with different timecodes and the same identifier based on a request from a third-party client. The number of identification codes with different timecodes is based on the duration. The example identification code encoder 106 is configured to determine an order of the identification codes (with the same identifier) based on the timecode and sequence the identification codes within the audio file accordingly.

The example identification code encoder 106 is also configured to place identification codes within an audio file based on an offset provided by a third-party client. The duration specifies a time offset from a beginning of the audio file from which identification codes are to begin. For example, a third-party client may request an audio file for a 30 second advertisement. However, the third-party client may only want to have identification codes between the 10 and 20 second marks of the advertisement. To accomplish this, the third-party client requests that the audio file have a 10 second duration for the identification codes, and a 10 second offset. The identification code encoder 106 accordingly creates a 10 second audio file with encoded identification codes having timecodes that begin at 10 seconds and conclude at 20 seconds. The third-party client may then embed the audio file into the media content between the 10 and 20 second marks. Thus, the detection of one of the identification codes enables, for example, the identification code manager 108 to determine at what time in the media content the identification code was detected based on the time code (e.g., the 15 second mark of the media content).

It should be noted that in the above example the third-party client specified a duration for the identification codes. However, in other examples, the third-party client may also specify a duration of the audio file and a duration for the identification codes. In these other examples, the identification code encoder 106 creates an audio file of the specified duration with identification codes repeating for the specified duration.

The example identification code encoder 106 is configured to determine a frequency band (or center frequency) to modulate the identification codes based on a specified channel. In instances where a center frequency is specified, the identification code encoder 106 modulates an identification code using frequencies that are, for example +/−100 Hz from the specified center frequency. FIG. 17 shows a diagram of example frequency ranges for different channels. It should be appreciated that the ability to modulate on different channels enables the identification code service 102 to remain flexible by enabling run-time configurations. This channel configuration also enables multiple identification codes to be layered within the same piece of media content, with each identification code occupying a different channel.

In some instances, the third-party client may specify the channel (e.g., select one of the channels shown in FIG. 17 that are inaudible to human hearing). In other examples, the identification code encoder 106 may determine a channel based on a third-party client type (e.g., identification codes for content producers are modulated on a first channel and identification codes for broadcasters are modulated on a second channel) and/or the third-party client (e.g., identification codes for the same third-party client are modulated on the same channel). Additionally or alternatively, the identification code encoder 106 may select the channel based on the media content delivery type. For instance, 17.1 kHz is considered safe for web-based low pass filters. Accordingly, the identification code encoder 106 may select this channel for identification codes that are to be embedded within Internet or web-based media content or media content to be transmitted through the Internet.

The example identification code encoder 106 is configured to transmit an audio file including one or more identification codes to a third-party client. The audio file may include a pulse-coded modulated Waveform Audio File Format ("WAV"), AC-3 format, advanced audio coding ("AAC") format, MP3, etc. In some instances, the third-party client may specify the audio file type (e.g., via interface 200 of FIG. 2). Alternatively, the identification code encoder 106 may select an audio file type based on the media content type that is to include the modulated identification code.

Embedder

The example embedder 114 of FIG. 1 is configured to merge or otherwise include an audio file having an identification code with media content. The example embedder 114 may be implemented via software and/or firmware enabling third-party clients to embed audio files into media content. Additionally or alternatively, the identification code service 102 may include the embedder 114 to embed an audio file into media content for third-party clients that do not have the capability. The example embedder 114 may transmit a message to, for example, the identification code manager 108 indicating that an identification code has been added to media content.

As discussed, the audio file includes one or more inaudible tones corresponding to one or more modulated identification codes. In some embodiments, the audio file has a sample rate of 48 kHz and a bit depth of 16 bits. The example embedder 114 is configured to embed the audio file based on the media content type and/or the transmission step of the media content.

For example, content producer third-party clients may embed audio files with identification codes during the editing process of media content. The example embedder 114 may impart an audio file into a timeline of the media content as a separate audio track. The embedder 114 is configured to mix the separate audio track having the identification code with other audio tracks of the media content. Thus, when the media content is rendered, the audio in the final output will include the modulated identification code regardless of the file format or codec used.

The example embedder 114 may also be located downstream from media content production. For example broadcaster third-party clients may access media content via an embedded Audio Engineering Society ("AES") stream of a serial data interface ("SDI") link. The example embedder 114 is configured to insert a new identification code and/or overwrite an already embedded identification code. To insert an identification code, the example embedder 114 determines the frequency or channel of the modulated identification code, determines an identification code does not already exist at that frequency or channel, and writes or inserts the modulated identification code into the downstream media content in an audio format of the rendered audio of the media content.

To overwrite an identification code, the example embedder 114 uses a notch filter (or any other band-stop filter) on the appropriate channel to remove the previous identification code from the rendered audio. The example embedder 114 then writes or inserts the modulated identification code into the downstream media content in an audio format of the rendered audio of the media content. The example embedder 114 also transmits a message to the identification code manager indicating at least one of the removed identification code and the inserted identification code. The third-party client may also provide content information associated with the inserted identification code.

Content Provider

The example content provider 116 is configured to transmit media content to one or more consumer devices 118. The content provider 116 may include a broadcaster, a service provider, a content provider, etc. The content provider 116 receives media content with an identification code from the embedder 114. After receiving the media content, the provider 116 is configured to convert the media content into a format for transmission. The content provider 116 may transmit the media content for multicast broadcast to consumer devices. Alternatively, the content provider 116 may store the media content to a database for unicast transmission per request from a consumer device.

Decoding Application

The example application 120 is configured to detect identification codes embedded within media content and generate events for the identification code tracker 110. The example application 120 may be installed on the consumer device 118 responsive to a consumer registering with the identification code service 102. For instance, a consumer may use a browser on the consumer device 118 to navigate to a webpage hosted by the identification code service 102 at, for example, the identification code manager 108. The webpage may prompt the consumer for information including, contact information, demographic information, geographic information, consumer device information, etc. After receiving this information, the identification code manager 108 transmits the application 120 to the consumer device 118. In other examples, the consumer may request the application 120 from, for example, an application store.

The example application 120 is compatible with an operating system of the consumer device 118 (e.g., iOS, Android, Windows, etc.). In addition to being standalone, the application 120 may be included within a software development kit ("SDK") that is integrated with another application for detecting and analyzing media content. For example, some third-party clients may have their own application that is configured to operate specifically in conjunction with media content associated with the third-party clients. In this instance, the application 120 may be included within the application of the third-party client.

The example application 120 may be configured to operate as a background process on the consumer device 118 monitoring digital and/or audio media content for identification codes. Upon detecting a code, the application 120 may transmit the identification code to the identification code service 102. The application 120 may alternatively queue detected identification codes and transmit the queued codes at predetermined time periods (e.g., hourly, daily, weekly, etc.).

In another example embodiment, the application 120 may instruct the consumer device 118 to wake or start the application 120 upon the consumer device 118 detecting that media content is being played by either the consumer device 118 or another device (e.g., presentation device 119). In this example, the application 120 may be turned off when the consumer device 118 is not playing media content so that the application 120 does not consume more battery power and processes of the consumer device than needed. For example, upon detecting that a consumer has opened a media content player or the consumer device 118 is downloading media content, the consumer device 118 may start the application 120. In another example, the consumer device 118 may activate the application 120 responsive to detecting audio signatures corresponding to media content (as opposed to audio signatures corresponding to conversations or environmental noise).

The example application 120 is configured to detect identification codes within a digital stream of data received from the content provider 116 and/or detect identification codes within analog audio signals transmitted through a speaker of the consumer device 118. It should be appreciated that the digital detection may be used when the consumer device 118 detects that a consumer is using earphones and sound is not being transmitted through a speaker. Alternatively, the application 120 performs both digital and analog detection so as to detect identification codes within media played on the consumer device 118 and to detect identification codes played by other presentation devices 119 (e.g., televisions) that are within (listening or detection) proximity of the consumer device 118.

It should also be appreciated that the application 120 may be implemented upstream from the consumer device 118. For example, the content provider 116 may include the application 120 (or functionality of the application) to digitally detect identification codes. The content provider 116 may pass media content through the application 120 prior to transmission to the consumer device 118. This upstream identification enables the identification code tracker 110 to display how (and when/where) media content is propagated through a broadcast or transmission framework.

The example application 120 is configured to digitally detect an identification code by decoding an audio track of the media content. The decoding may be performed on at least a half second of audio to make an appropriate detection. The application 120 uses, for example, fast Fourier transforms to detect a presence of frequencies in one or more specified channels. The application 120 is configured to demodulate the audio by reversing the process used by the identification code encoder 106 if a frequency is present. The application 120 reads the demodulated data to determine the identification code including an identifier and timecode. After determining the identifier and timecode, the application 120 then transmits a message to the identification code service 102 including the identification code.

The example application 120 is also configured to detect identification codes included within analog signals (e.g., sound waves). The example application 120 is configured to determine an analog identification code by analyzing sound waves received by a microphone of the consumer device 118. The example application 120 converts the sound waves into a digital signal so that the identification code is demodulated using the procedure described above in conjunction with the digital detection (including the sampling of the signal to determine the presence of an identification code). The example application 120 also performs error correction on the demodulated audio to remove or filter noise.

It should be appreciated that the analog detection enables virtually any device with a microphone to function as a detector of identification codes. This enables, for example, a smartphone to detect identification codes of media content not only played on the smartphone but any media content exposed to the consumer (e.g., media content played by a television, media content played within a store, media content played on a computer, etc.).

The example application 120 is also configured to generate events. As discussed, the events may include data of a detected identification code and/or content information received from the identification code manager 108. The event may include, for example, a time/date an identification code was detected, an identifier of the consumer device 118 (and/or a username of the consumer), content information (e.g., metadata), etc. In instances where the application 120 performs an action (or causes the consumer device 118 to perform an action) based on content information, the application 120 may also include information regarding the action (e.g., an indication a webpage was accessed or a file of content information was played).

The example application 120 transmits messages including the events to the identification code tracker 110. The example application 120 may transmits an event after the event is generated or queue events and transmit the queued events at a specified time. In some instances, the application 120 may transmit events during periods of low data usage by the consumer device 118.

Identification Code Manager

The example identification code manager 108 is configured to manage identification codes. As discussed, identification codes are relatively low data objects that include only an identifier, a timecode, and parity bits. The example identification code manager 108 enables third-party clients to associate content information with identification codes and store this association in a database 124. The identification code manager 108 enables content information of any size and/or type to be associated and stored in conjunction with identification codes. The identification code manager 108 also enables third-party clients to update the content information at any time. This flexibility enables third-party clients to dynamically assign content information to identification codes without limitation, even after identification codes have been modulated and embedded within media content.

The example identification code manager 108 receives messages indicating new identification codes from, for example, the identification code generator 104, the identification code encoder 106, and/or the embedder 114. The messages may include, for example, a copy of the identification code (including an identifier, timecode, and/or parity bits), a date/time the identification code was created, a third-party client that requested the identification code, etc.

After receiving a message, the identification code manager 108 stores the contents of the message to a data structure within the database 124, which is accessible by third-party clients.

Figure 4:
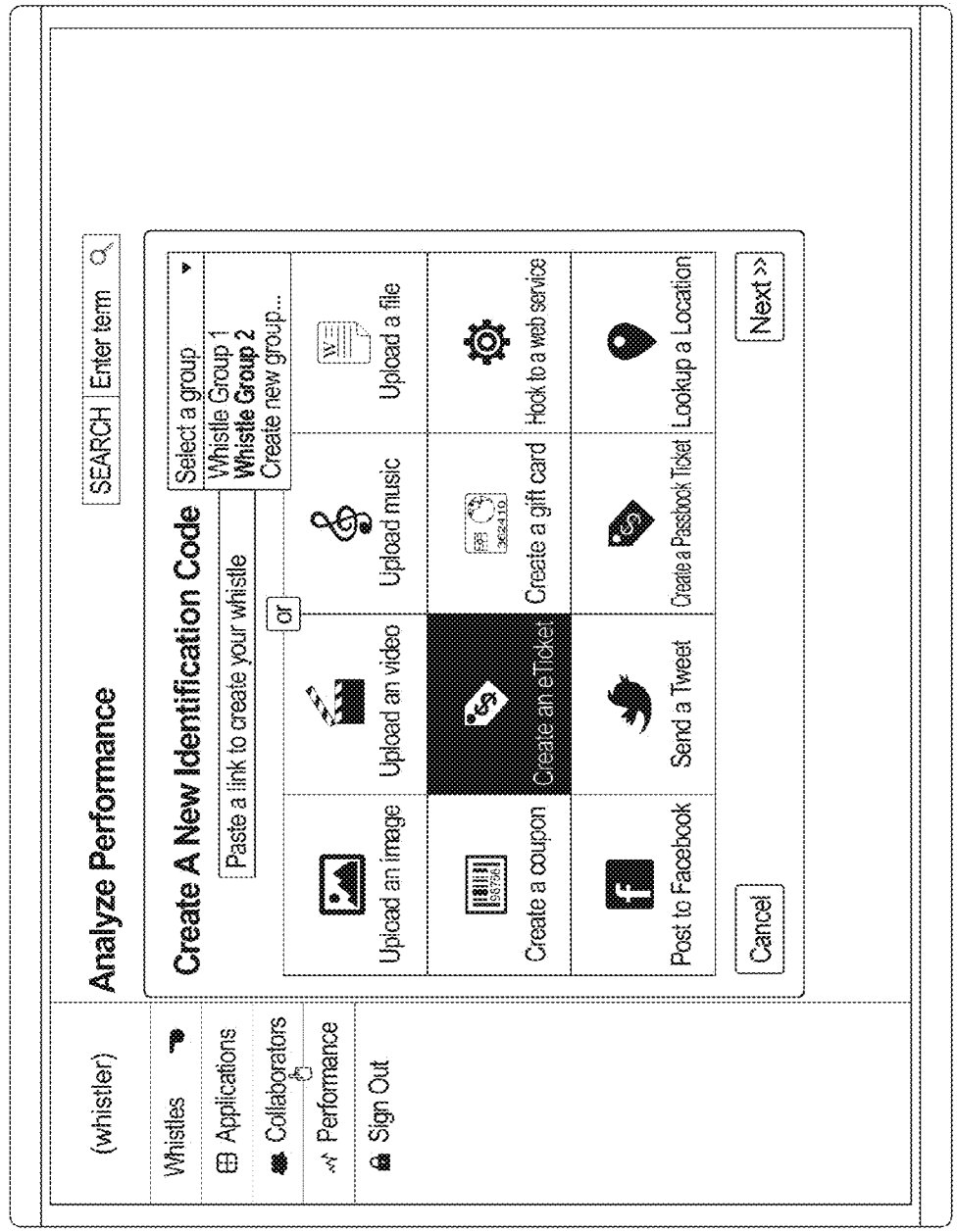
FIG. 4 shows a diagram of an example interface configured to prompt third-party clients for content information associated with identification codes, according to an example embodiment of the present disclosure.

The example identification code manager 108 is configured to receive content information from third-party clients (e.g., the third-party client 112 of FIG. 1). FIG. 4 shows an example interface 400 that enables a third-party client to upload content information to the identification code manager 108. As shown, the content information may include a file, a video, an image, music, a gift card, a hyperlink to a web service, or a link to a social media application. For example, the content information could include bonus content associated with media content viewed by a consumer.

The content information may also include metadata associated with the media content in which a corresponding identification code is embedded. For example, the content information may include a secondary identifier such as, for example, an EIDR, Ad-ID, and/or a SMPTE-Unique Material Identifier ("UMID"). The content information may also include an expanded media content description, an entire EIDR record, content title, synopsis, length, characters, product being advertised, etc. The content information may also include promotional codes, coupons, media files or other items that may be transmitted to a consumer device 118 that detects an identification code.

The example identification code manager 108 may host a web application that enables third-party clients to provide and/or update content information, as shown in FIG. 4. Alternatively, the identification code manager 108 may host a RESTful web service that enables third-party clients to provide and/or update content information. It should be appreciated that the identification code manager 108 provides a third-party client access to only identification codes requested by the third-party client. Thus, the identification code manager 108 prevents a third-party client from viewing identification codes and/or content information provided by another third-party client (unless authorization is provided).

FIGS. 5 and 6 show exemplary respective data structures 500 and 600 of identification codes and content information stored by the identification code manager 108 within the database 124. The data structures 500 and 600 include fields for identification codes, content information, and third-party client (e.g., requestor). The exemplary data structures 500 and 600 also include a field for a flag to indicate whether the content information is to be transmitted to a consumer device and a field for a flag to indicate whether the identification code is active. The consumer device field prevents, for example, EIDRs (or other sensitive content information) from being transmitted to unauthorized third-parties. It should be appreciated that in other embodiments the data structures 500 and 600 may include additional or fewer fields.

As discussed, the identification code manager 108 creates a new entry when a message is received that includes a newly generated identification code. The identification code includes an identifier and a timecode. The example identification code manager 108 stores the timecode so that a third-party client may use multiple identification codes with the same identifier within the same media content but associate different content information based on the timecode. For instance, a third-party client may request an audio file where the first 30 seconds include an identification code with an identifier and a first timecode (or set of timecodes) and the last 3 seconds includes an identification code the same identifier and a second time code (or set of timecodes). The third-party client may indicate that the first timecode (or set of timecodes) corresponds to first EIDR content information and the second timecode (or set of timecodes) corresponds to second EIDR content information. Alternatively, instead of providing second EIDR content information, the third-party client may specify that the second timecode (or set of timecodes) corresponds to a hyperlink to be transmitted to a consumer device.

The identification code accordingly enables a third-party client to track which consumers viewed media content while also specifying content information to transmit to the consumers within the same audio file using two different identification codes modulated on the same channel. Such a configuration may, for example, enable a third-party client to determine which consumers initially viewed media content and provide the consumers that finished viewing the media content with content information. It should be appreciated that the identification code service 102 provides third-party clients with the flexibility to encode different identification codes within the same or different audio files, at the same or different channel, and/or with the same or different identifiers and/or timecodes based on the preference of the third-party clients. For example, one third-party client may desire to encode all identification codes at a specific channel while another third-party client may desire to encode identification codes corresponding to secondary identifiers at one channel while encoding identification codes corresponding to consumer-based content information at a second channel.

Returning to FIGS. 5 and 6, the identification code manager 108 provides the third-party clients access to the data structures 500 and 600 to provide and update content information. For example, in FIG. 5 the 'Content Creator 1' third-party client locates the 'ACB3341R' identification code and adds the EIDR content information. The 'Content Creator 1' third-party client also specifies that the EIDR content information is not to be transmitted to a consumer device and is to be active. The 'Content Creator 1' third-party client also provides hyperlink 'www.contentsite.com' content information for the 'ACD3341S' identification code and provides 'promo code 445' content information for the 'ACE6HI0P' content information. At a later time, the 'Content Creator 1' third-party client may change the website and promo code. Instead of having to generate a new identification code and modulate the code into media content for redistribution, the 'Content Creator 1' third-party client only has to access the database 124 and update the content information. As shown in data structure 600 of FIG. 6, the identification code manager 108 enables the 'Content Creator 1' third-party client to change the website to 'www.contentsiteupdate.com' and the promo code to 534.

The example identification code manager 108 may organize the identification codes within the data structures 500 and 600 in a hierarchical manner. Alternatively, the third-party client may organize the identification codes. For example, for a third-party client, the identification codes may be organized based upon media content type at a highest level, program name, at a next highest level, broadcast date, at a next highest level, and broadcast time, at a lowest level. Such a configuration enables a third-party client to quickly access and efficiently manage identification codes without undue searching. The identification code manager 108 may determine hierarchy based on, for example, identification code identifier, timecode, secondary identifier, media content descriptor, etc.

It should be appreciated that the identification code manager 108 in conjunction with the rest of the identification code service 102 provides a single mechanism that can be used to retrieve data about any type of media content. A third-party client only has to access the identification code service to define content information and view which identification codes have been detected. Without this layer of abstraction, a known decoder with conditional logic has to accesses multiple registries (e.g., an Ad-ID registry or an EIDR registry) to determine content information. The identification code enables content information to be easily updated regardless of the emergence of new secondary identifiers or modification of current secondary identifiers.

In addition to enabling third-party clients to manage content information assigned to identification codes, the example identification code manager 108 is configured to manage the detection of identification codes and the transmission of content information to consumer devices 118. As discussed, the application 120 on the consumer device 118 is configured to transmit one or more messages including detected identification codes. The identification code manager 108 is configured to receive the messages and access the data structures 500 and 600 within the database 124. The identification code manager 108 references the detected identification codes to content information (and the consumer device flag). Conditioned on a flag indicating that the content information is to be transmitted (in addition to authentication provided by a consumer device 118), the example identification code manager 108 transmits the content information to the consumer device 118 that provided the identification code. The identification code manager 108 may also monitor the consumer device 118 or receive indications from the application 120 that the consumer device 118 used or processed the received content information. In addition to or alternative to the consumer device flag, the identification code manager 108 may also restrict (or select) which content information is provided to a consumer device 118 based, for example, on device type, location of the device, consumer demographic information, etc.

Figure 7:
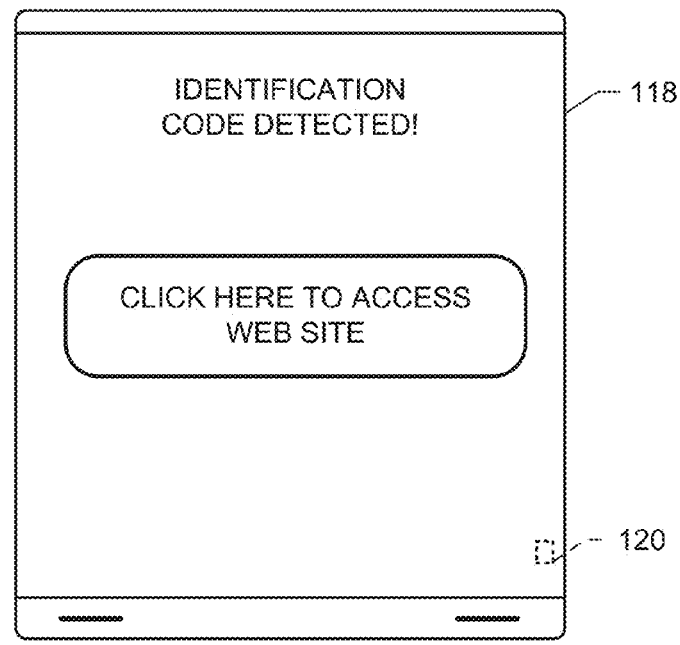
FIGS. 7 and 8 show diagrams of content information being displayed on a consumer device, according to an example embodiment of the present disclosure.
Figure 8:
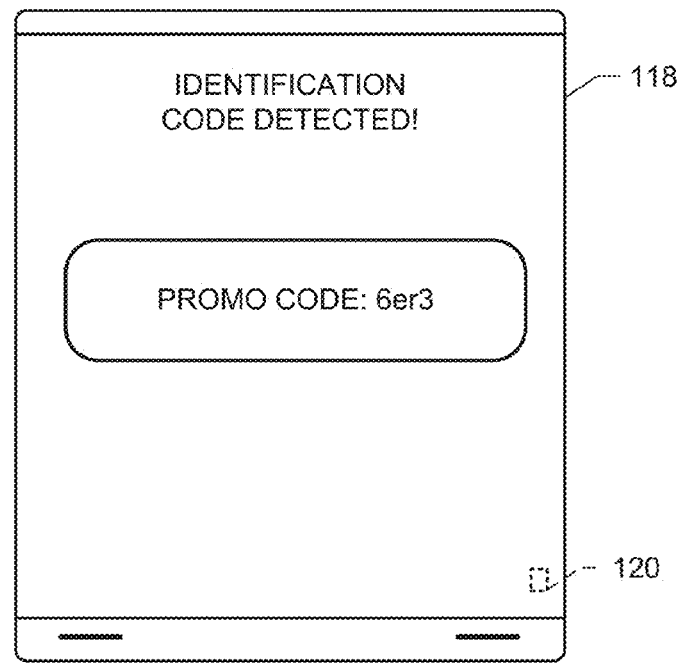

For example, FIGS. 7 and 8 show diagrams of content information being displayed on consumer device 118. FIG. 7 shows an example where the content information includes a hyperlink and a message requesting the consumer to access the hyperlink. The application 120 may monitor if/when the consumer accesses the hyperlink and report the activity to the identification code manager 108 and/or identification code tracker 110. FIG. 8 shows an example where the content information includes a promotional code. The application 120 may monitor whether the consumer uses the promotion code on the consumer device 118. Alternatively, a third-party client that processes the promotion code may transmit an indication to the identification code manager 108 and/or the identification code tracker 110 of the use of the promotional code.

In instances where the content information is not to be transmitted to a consumer device, the identification code manager 108 creates an event of the detection and transmits the event to the identification code tracker 110. As mentioned above, an event includes a detection of an identification code and may include content information provided by a third-party client (e.g., EIDR), which provides more useful or descriptive information about the detected media content. The event may also include information about the consumer and/or consumer device that detected/heard the media content. As discussed, the identification code manager 108 may store the consumer's information provided at registration to the database 124 for association with detected identification codes to provide a profile associated with the detection.

While discussion has been focused on detection by consumer devices, the identification code manager 108 may also receive messages of identification codes detected upstream from, for example, application 120 included within broadcast and distribution hardware. The identification code manager 108 may create events for upstream detection and indicate the party or entity that processed or distributed the media content. Alternatively, the identification code manager 108 may receive a message including an event from an upstream entity that detected the identification code. Such information may be valuable to content producers to see how (when and/or where) their media content is distributed and/or broadcast.

Identification Code Tracker

The example identification code tracker 110 is configured to compile and generate reports based on events provided by the application 120 and/or the identification code manager 108. The example identification code tracker 110 makes aggregated data reported within events graphically available for the third-party client associated with the detected identification codes (or other subscribing third-party clients). The graphical display may be context-based so as to be beneficial to the receiving client. For example, content producer third-party clients may be interested in knowing which regions of the United States viewed media content while a broadcaster third-party client may be interested in knowing demographics of consumers that viewed the same media content.

It should be appreciated that the identification code tracker 110 is configured to report detected identification codes throughout the code's lifecycle. Accordingly, the identification code tracker 110 may report, for example, detected identification codes included within media content stored on a digital video recorder every time the media content is replayed. This configuration enables third-party clients to view how media content is consumed over time in addition to initial broadcast.

The example identification code tracker 110 is configured to update graphical indications of events in real-time. The identification code tracker 110 may structure the events so that data may be displayed in a hierarchical manner. For example, a map may display metrics by advertiser, parent company, prefix, time/date, consumer device data, demographic data, etc. In some instances, the identification code tracker 110 may transmit events and/or data aggregated within events to third-party clients. The data may be provided within the JavaScript Object Notation ("JSON") format to enable offline processing by the third-party clients.

Figure 9:
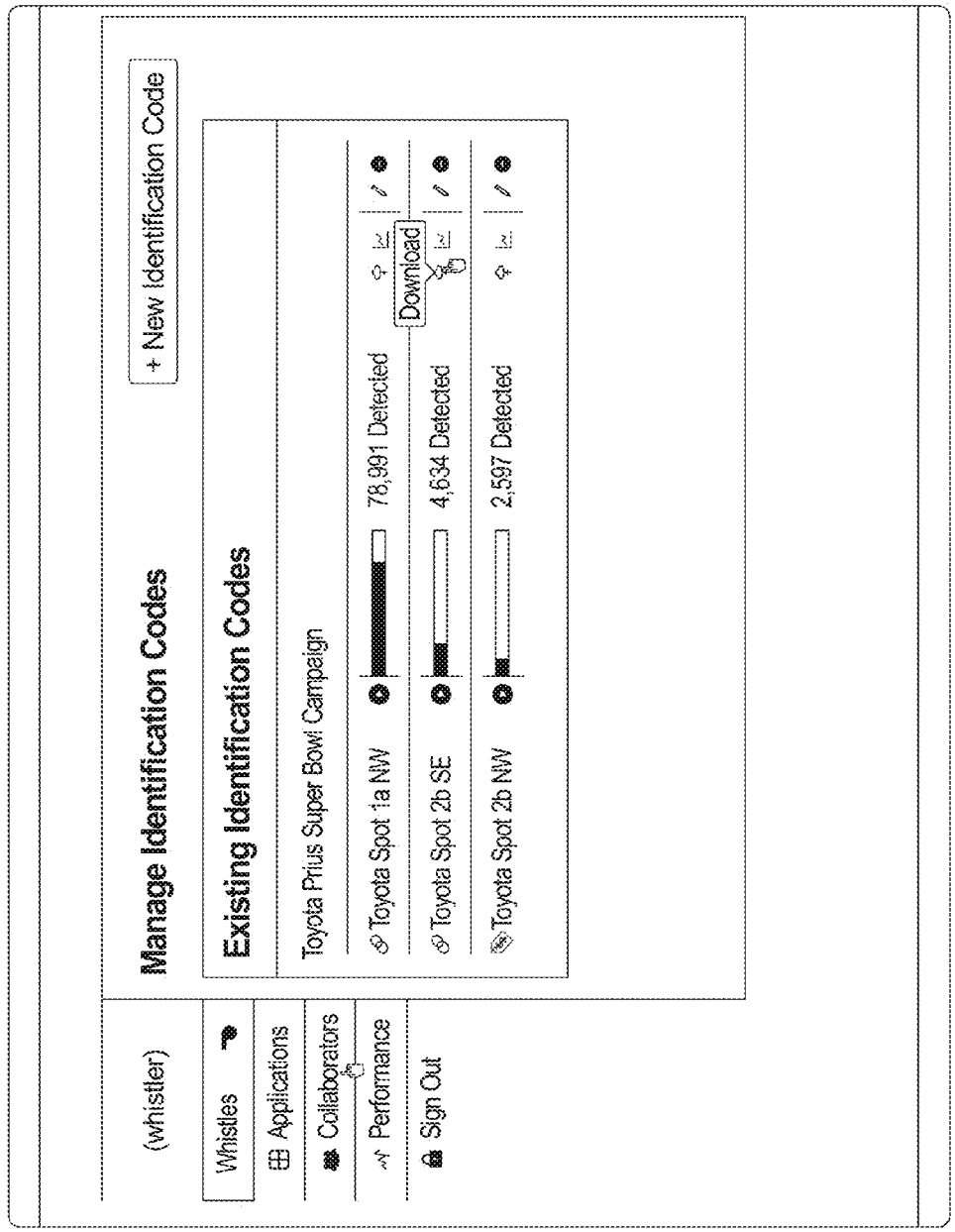
FIG. 9 shows an example of identification codes that have been created for a third-party client, according to an example embodiment of the present disclosure.
Figure 10:
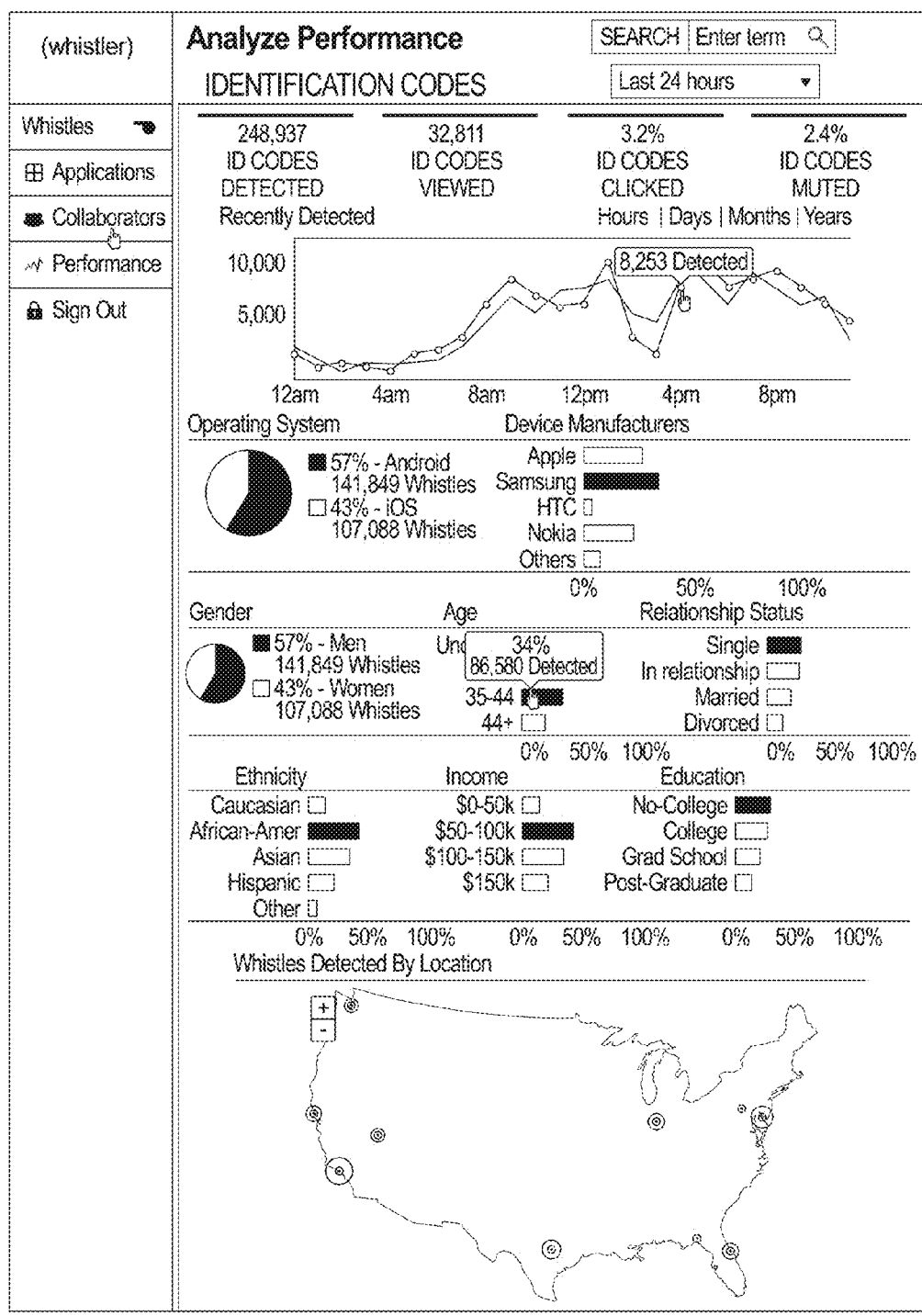
FIG. 10 shows an example of a plurality of events graphically displayed based on detected identification codes, according to an example embodiment of the present disclosure.

FIGS. 9 and 10 show examples of data reported by events graphically displayed by the identification code tracker 110. For example, FIG. 9 shows a report of a number of detected identification codes for a third-party client. In this example, the third-party client is associated with three different identification codes for three advertisements. The example identification code tracker 110 makes the data available by compiling events associated with the three identification codes and rendering data for display within interface 900 based on the compiled data.

FIG. 10 shows a report 1000 for a third-party client of all identification codes detected during a time period. The report 1000 includes a total number of identification codes detected, a number of media content viewings, a number of consumer clicks of content information, and a number of media content muted by consumers. The report 1000 also includes identification code detections per intervals of time, consumer device metrics, demographic metrics, and geographic metrics associated with the detection.

The example identification code tracker 110 generates the report by compiling events and compiling the information included within the events. The example identification code tracker 110 may also analyze the compiled information from the events, perform calculations on the compiled information, and/or rank the aggregated/analyzed/calculated information to generate data for the report 110. As shown in FIG. 10, the graphical indications can include numeric values, a line chart, a pie chart, a bar chart, a map, etc. In addition to the data shown within FIG. 10, the example identification code tracker 110 may analyze or process event data to show identification code detections based on location, city, postal code, country, region, area code, metro code, latitude, longitude, time zone, IP address, wireless (or Internet) carrier, country code, country name, operator name, mobile network code, mobile country code, consumer device type, operating system, operating system version, manufacturer, model, screen size, screen resolution, RAM, storage size, processor manufacturer, processor model, processor speed, number of processor cores, processor architecture, gender, date of birth, relationship status, income, education level, language preference, number of children, ethnicity, religion, occupation, hobbies, interests, and/or sexual orientation.

The example identification code tracker 110 (and/or the identification code manager 108) may publish events to subscribing third-party clients. For instance, the identification code tracker 110 may include an interface (e.g., an API) that enables third-party clients to subscribe to events that include, for example, identification codes requested by the respective client. A third-party client may subscribe by providing an address (e.g., a callback uniform resource locator ("URL")) to which messages including events are transmitted. Alternatively, a third-party client may use the WebSocket protocol to maintain a persistent connection with the identification code service 102.

The example identification code tracker 110 may enable a third-party client to specify filter criteria such that the client is only notified of events with specific attributes. For example, a third-party client may provide one or more EIDRs. The identification code tracker 110 determines which of the events are associated with the specified EIDRs and transmits messages including those events to the third-party client. In another example, a third-party client may subscribe to events that are associated with Ad-IDs having a certain prefix. It should be appreciated that the filter criteria is limitless based on the information included within events (e.g., broadcast channel, geographic location, demographic information, detection time/date, etc.).

The publication of events by the identification code tracker 110 enables subscribing third-party clients to determine precisely when identification codes are detected and/or how content information is processed. A subscribing third-party client may use their own tools to further process and analyze the data included within the events. In some instances, the third-party client may use analysis and/or reports provided by the identification code tracker 110 in conjunction with the client's own analysis.

Dataflow of the Identification Code Service

Figure 11:
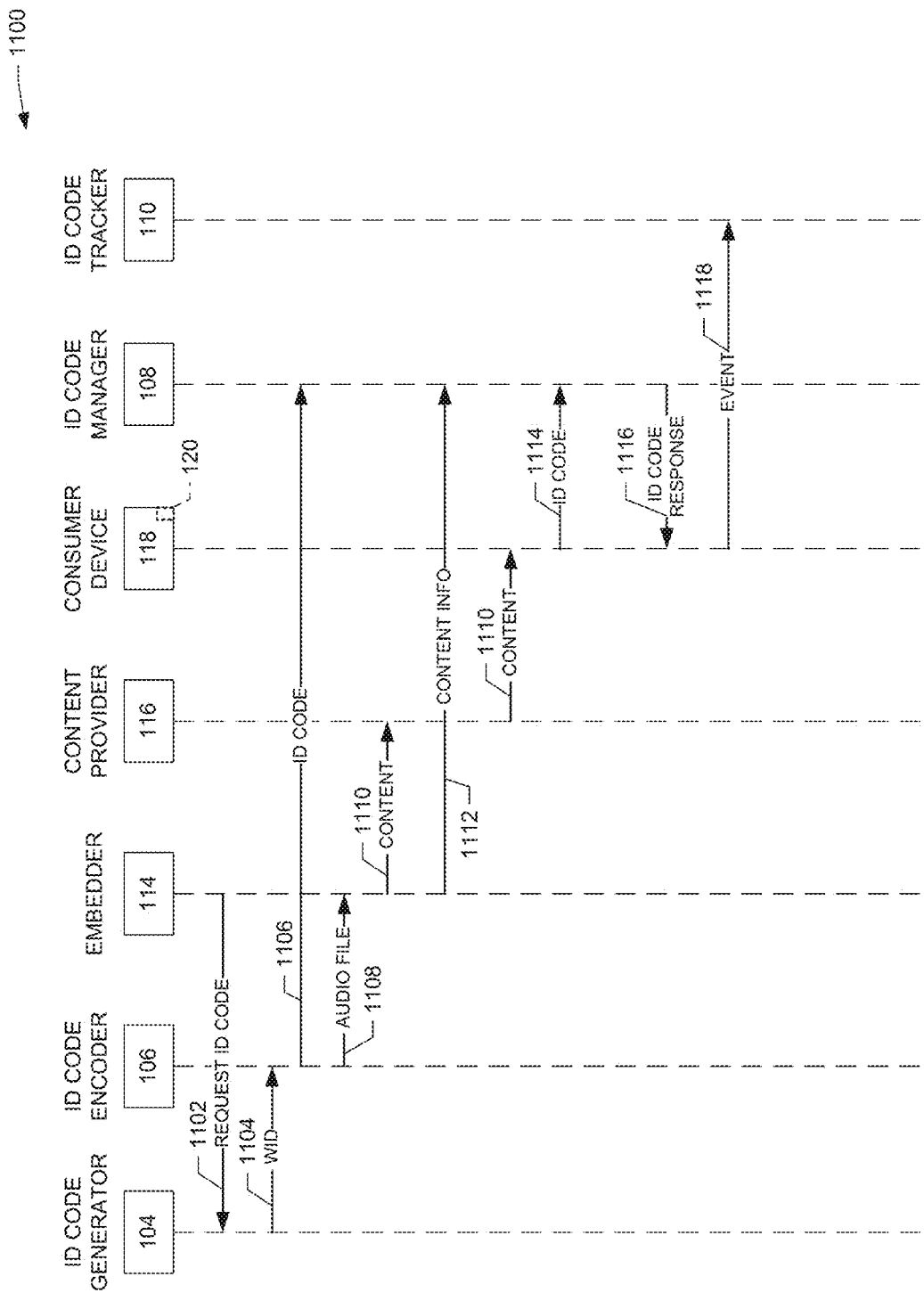
FIGS. 11 and 12 are diagrams showing example data flow in the identification code management environment of FIG. 1, according to an example embodiment of the present disclosure.
Figure 12:
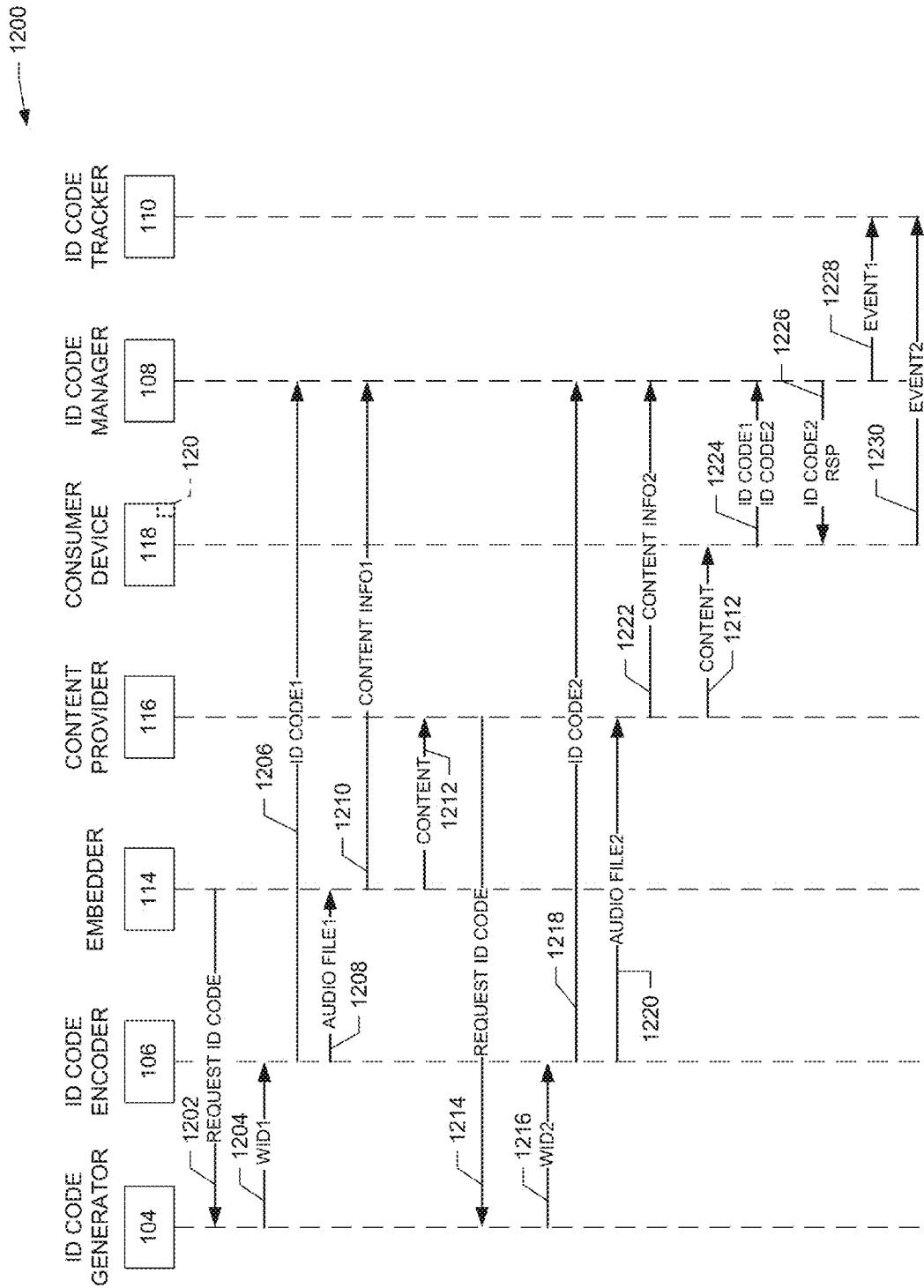

FIGS. 11 and 12 are diagrams showing example data flow 1100 and 1200 in conjunction with the identification code service 102 of FIG. 1 disclosed herein. The data flows 1100 and 1200 include creation of an identification code, inclusion of the identification code within media content, detection of the identification code within media content, and processing performed based on the detection. The data flow 1100 begins when a third party client 112 (in this example, the embedder 114) transmits a request message 1102 requesting an identification code. The request message 1102 includes, for example, an identifier of the third-party client, an indication the third-party client desires to receive an audio file with the identification code, and/or a type of media content associated with the identification code.

After receiving the message 1102, the identification code generator 104 creates an identifier (WID) and transmits a message 1104 to the identification code encoder 106 including the identifier (WID). After receiving the message 1104, the identification code encoder 106 generates an identification code (ID Code) based on the identifier (WID) and modulates the identification code into an audio file 1108 (e.g., Audio File). The identification code encoder 106 creates a record of the identification code within a data structure and transmits a message 1106 to the identification code manager 108 identifying the newly created identification code (ID Code).

The identification code encoder 106 also transmits a message including the audio file 1108 to the embedder 114 of the third-party client. Alternatively, the audio file may be transferred directly via a file transfer protocol. The example embedder 114 adds or combines the audio file into media content (e.g., Content) 1110. The embedder 114 transmits the media content 1110 to the content provider 116 for distribution. The example embedder 114 also accesses the identification code manager 108 and transmits a message 1112 including content information (e.g., Content Info) that is to be stored in conjunction with the identification code (ID Code).

The example content provider 116 transmits the media content 1110 to the consumer device 118 via, for example the Internet or a cable service. An application 120 on the consumer device 118 detects and decodes the identification code (ID Code) included within the media content (Content). The application 120 causes the consumer device 118 to transmit a message 1114 that includes the detected identification code (ID Code). In this example, the identification code manager 108 receives the message 1114 and determines that content information is to be transmitted to the consumer device 108. The identification code manager 108 accordingly transmits one or more messages 1116 (e.g., ID Code Response) that includes the content information. The application 120 on the consumer device 118 receives the content information and generates a corresponding event. The application 120 transmits a message 1118 to the identification code tracker 110 including the event and associated data. As discussed above, the identification code tracker 110 makes the event graphically available to the third-party client.

FIG. 12 shows another flow diagram. In this example, the content provider 116 and the embedder 114 request identification codes. For instance, the embedder 114 may include a content producer third-party client and the content provider 116 includes a broadcaster third party client. Similar to FIG. 11, the embedder 114 transmits a message 1202 including a request for an identification code. In response to the message 1202, the identification code generator 104 determines or generates identifier (WID1). The identification code generator 104 transmits a message 1204 to the identification code encoder 106 including the identifier (WID1) in addition to audio file parameters provided by the embedder 114 (e.g., the third-party client).

The example identification code encoder 106 generates an identification code (ID Code1) based on the identifier (WID1) and transmits a message 1206 to the identification code manager 108 identifying the newly determined or created identification code (ID Code1). The identification code encoder 106 also modulates the identification code (ID Code1) into an audio file (Audio File1) according to the specified parameters and transmits a message 1208 including the audio file to the embedder 114. The embedder 114 adds or combines the audio file into media content (e.g., Content) 1212. The embedder 114 transmits the media content 1212 to the content provider 116 for distribution. The example embedder 114 also accesses the identification code manager 108 and transmits a message 1210 including content information (e.g., Content Info1) that is to be stored in conjunction with the identification code (ID Code1).

In this example embodiment, the content provider 116 also transmits a message 1214 requesting an identification code. The identification code generator 104 determines or creates a second identifier (WID2) and transmits a message 1216 including the identifier (and specified parameters) to the identification code encoder 106. The example identification code encoder 106 generates an identification code (ID Code2) based on the identifier (WID2) and transmits a message 1218 to the identification code manager 108 identifying the newly determined or created identification code (ID Code2). The identification code encoder 106 also modulates the second identification code (WID2) into an audio file (Audio File2) according to the specified parameters and transmits a message 1220 including the audio file to the content provider 116.

The content provider 116 adds the audio file (Audio File2) to the content 1212 as described above in conjunction with FIG. 1 with regard to embedding identification codes downstream from media content production. The content provider 116 transmits a message 1222 to the identification code manager 108 including content information (Content Info2) to be associated with the second identification code (ID Code2). The content provider 116 also transmits the media content to the consumer device 118.

An application 120 on the consumer device 118 detects and decodes the identification codes (ID Code1, ID Code2) included within the media content (Content). The application 120 causes the consumer device 118 to transmit a message 1224 that includes the detected identification codes (ID Code1, ID Code2). In this example, the identification code manager 108 receives the message 1224 and determines that content information associated with the identification code ID Code2 is to be transmitted to the consumer device 118. The identification code manager 108 accordingly transmits one or more messages 1226 (e.g., ID Code2 Response) that includes the content information. The example identification code manager 108 also determines that an event is to be generated based on the detection of identification code (ID Code1). The identification code manager 108 accordingly generates an event based on the detection and transmits a message 1228 to the identification code tracker 110 including the event. Additionally, the application 120 transmits a message 1230 to the identification code tracker 110 including the event and associated data corresponding to the content information within the message 1226. The identification code tracker 110 makes the events graphically available to the respective third-party clients. For example, the data of the event associated with the ID Code1 is made available to the embedder 114 third-party client and the data of the event associated with the ID Code2 is made available to the content provider 116 third-party client.

Flowchart of the Example Process

Figure 13:
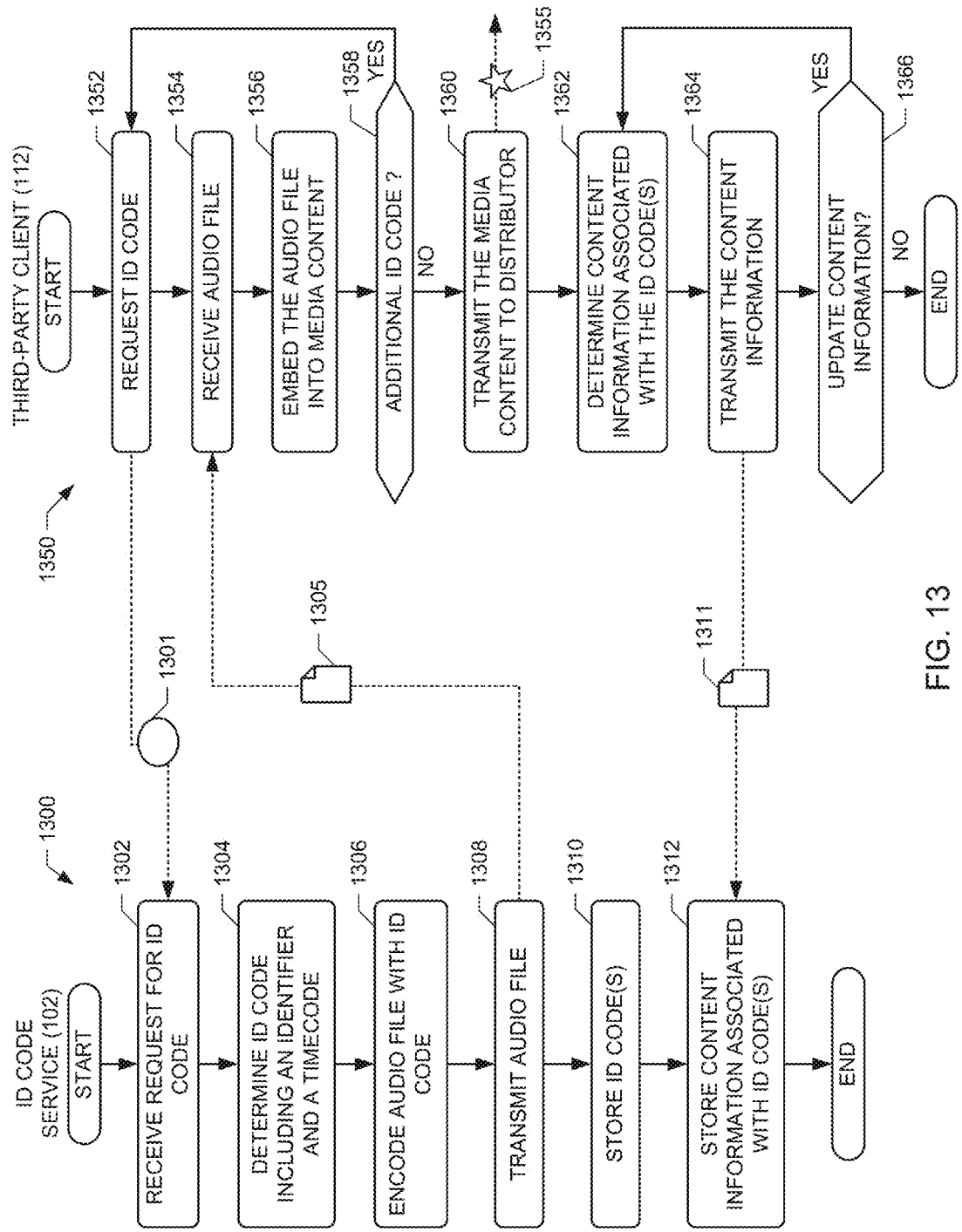
FIG. 13 illustrates flow diagrams showing example procedures to create and manage an identification code, according to an example embodiment of the present disclosure.
Figure 14:
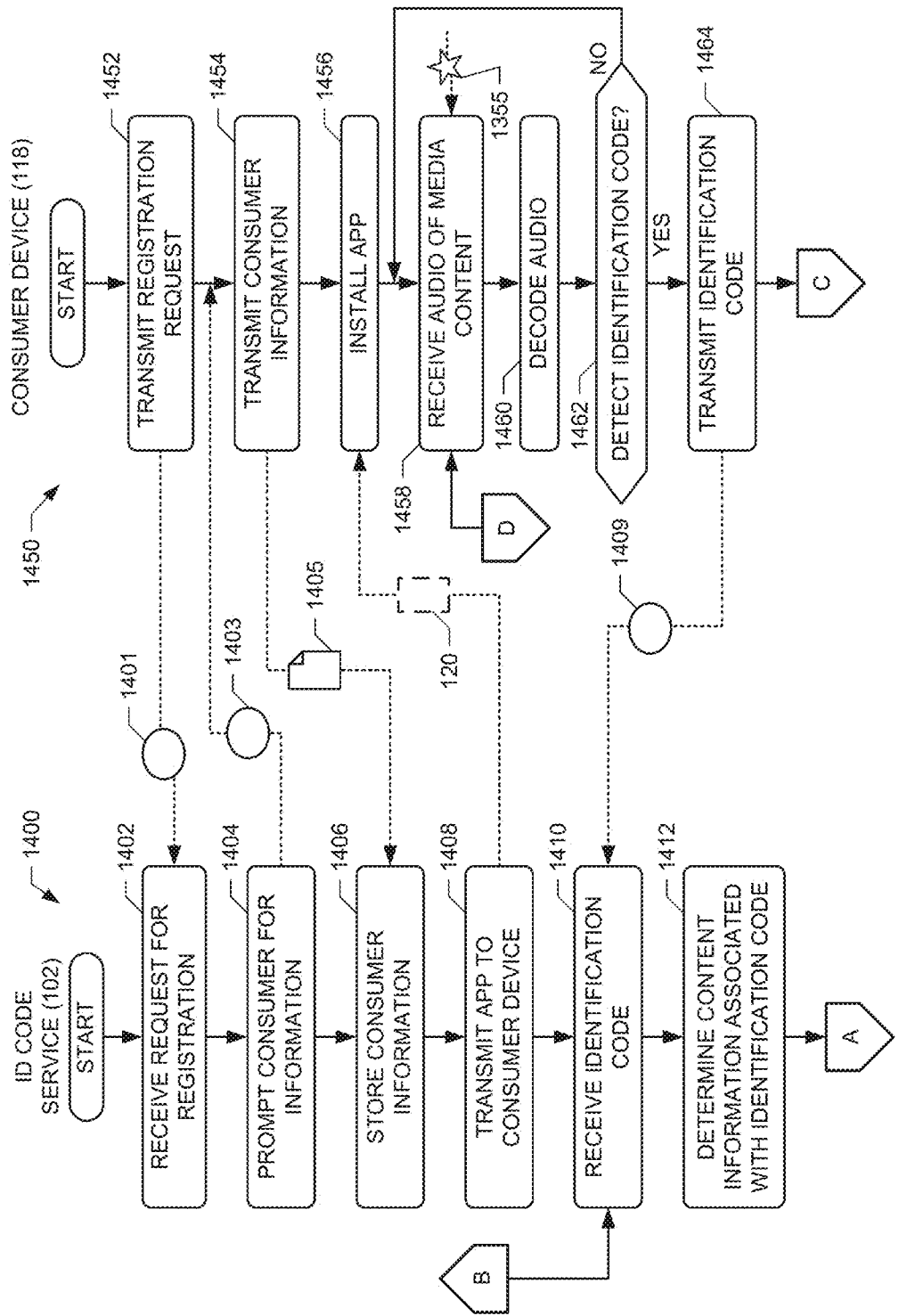
FIGS. 14 and 15 illustrate flow diagrams showing example procedures to detect and track identification codes, according to an example embodiment of the present disclosure.
Figure 15:
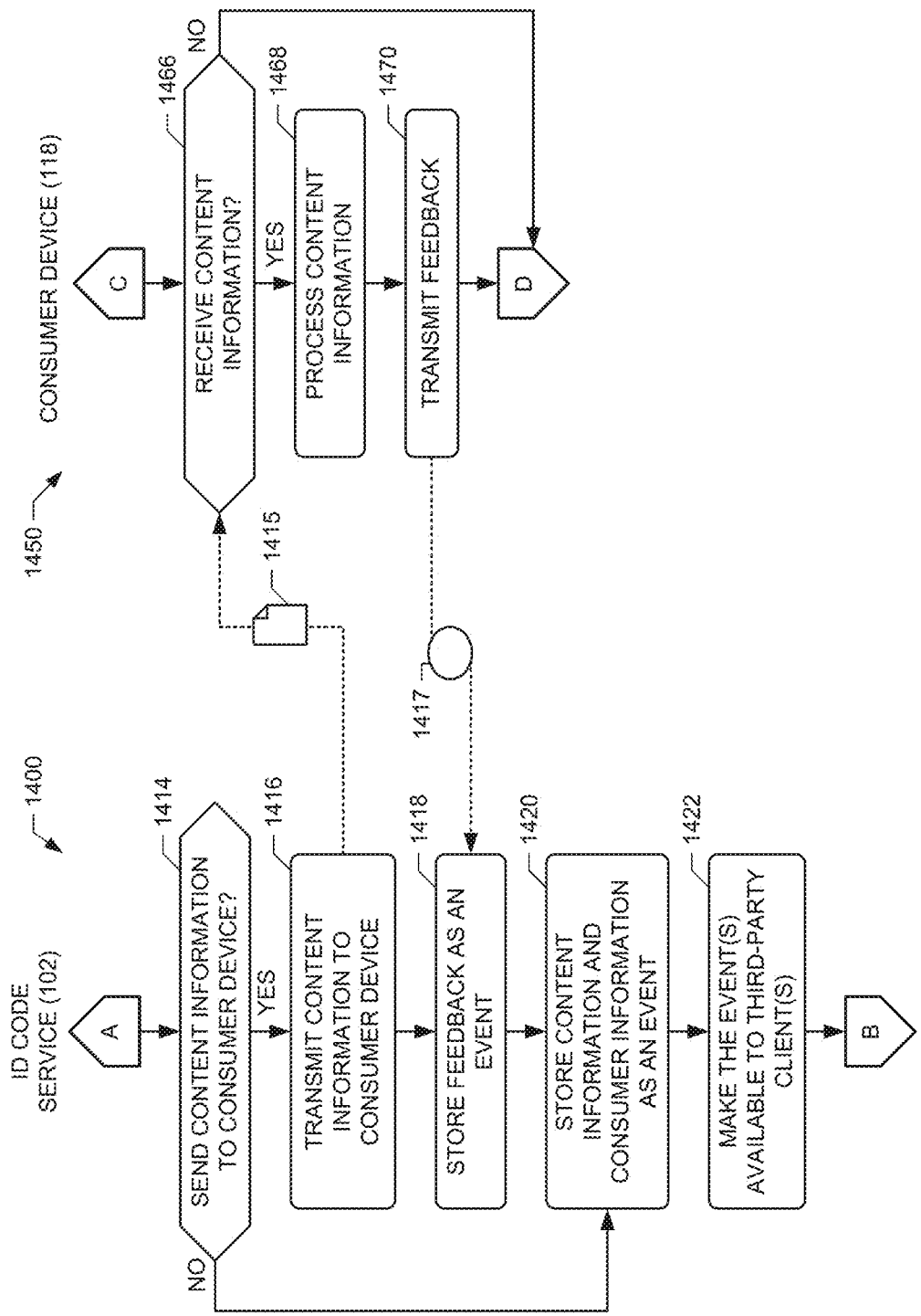

FIGS. 13 to 15 illustrate flow diagrams showing example procedures 1300, 1350, 1400, and 1450 to create, manage, detect, and track identification codes, according to an example embodiment of the present disclosure. Although the procedures 1300, 1350, 1400, and 1450 are described with reference to the flow diagram illustrated in FIGS. 13 to 15, it will be appreciated that many other methods of performing the steps associated with the procedures 1300, 1350, 1400, and 1450 may be used. For example, the order of many of the blocks may be changed, certain blocks may be combined with other blocks, and many of the blocks described are optional. Further, the actions described in procedures 1300, 1350, 1400, and 1450 may be performed among multiple devices including, for example the identification code generator 104, the identification code encoder 106, the identification code manager 108, the identification code tracker 110 (collectively the identification code service 102), the embedder 114, the content provider 116, and/or the consumer device 118.

The example procedure 1300 of FIG. 13 operates on, for example, the identification code generator 104, the identification code encoder 106, and the identification code manager 108 of FIG. 1. The procedure 1300 begins when the identification code service 102 receives a message 1301 from a third-party client 112 including a request for an identification code (block 1302). The message 1301 includes, for example, a request for an audio file with one or more identification codes with the same identifier and parameters for the audio file. The identification code service 102 determines one or more identification codes including an identifier and timecode(s) (block 1304).

The example identification code service 102 then encodes the one or more identification codes into an audio file 1305 based on the parameters provided by the third-party client 112 (block 1306). The example identification code service 102 transmits the audio file 1305 to the third-party client (block 1308), thereby enabling the third-party client to embed the audio file 1305 into media content. The example identification code service 102 also stores the generated identification codes to a database (block 1310). The example identification code service 102 further stores content information 1311 received from the third-party client 112 in conjunction with the identification codes (block 1312). At this point, the example procedure 1300 ends. Alternatively, the procedure 1300 may return to block 1312 if the third-party client 112 provides updated content information 1311 or block 1302 if another request for an identification code is received.

The example procedure 1350 operates on, for example, the embedder 114 and the content provider 116 of the third-party client 112 of FIG. 1. The procedure 1350 begins when the third-party client 112 transmits a message 1301 to the identification code service 102 for an identification code (block 1352). The message 1301 may include a request for an audio file. In other embodiments, the message 1301 may include a request for just the identification code or the message 1301 may include the media content to which the identification code is to be embedded. It should be appreciated that the steps performed by the third-party client 112 changes based on the type of request. For instance, the identification code service 102 embeds an identification code into media content instead of the third-party client 112 when the third-party client 112 provides the media content in conjunction with the request for the identification code.

Returning to the procedure 1350, the third-party client 112 receives an audio file 1305 (per request) from the identification code service 102 (block 1354). The third-party client 112 then embeds the audio file with the identification code(s) into media content 1355 (block 1356). The third-party client 112 may also determine whether additional identification codes are desired for the media content (block 1358). The third-party client 112 requests more identification codes (and embeds the corresponding audio files into the media content) if additional identification codes are desired (block 1352).

However, if no other identification codes are needed, the third-party client 112 transmits the media content 1355 to a downstream distributor and/or broadcaster (block 1360). The example third-party client 112 also determines content information 1311 that is to be associated with each of the identification codes included within the media content 1355 (block 1362). The third-party client 112 transmits or otherwise provides the identification code service 102 with the content information 1311 (block 1364).

The third-party client 112 may determine that at least some of the content information 1311 is to be updated or changed (block 1366). Conditioned on making this determination, the third-party client 112 transmits the updated or changes content information 1311 to the identification code service 102. The identification code service 102 accordingly uses this updated or changed content information 1311 when an identification code is detected. The example procedure 1350 ends if the third-party client does not need to update or change the content information. Alternatively, the example procedure 1350 may not end until the third-party client 112 deactivates the generated identification codes.

Turning to FIGS. 14 and 15, the example procedure 1400 operates on, for example, the identification code manager 108 and the identification code tracker 110 of FIG. 1. The procedure 1400 begins when the identification code service 102 receives a request message 1401 to register a consumer with the identification code tracking service (block 1402). Responsive to the message 1401, the identification code service 102 transmits, for example, a web form 1403, to the consumer device 118 promoting the consumer for registration information (e.g., home address, demographic information, device information, etc.) (block 1404). The prompt may also be provided via an interface or webpage. The example identification code service 102 receives the consumer information 1405 from the consumer device 118 and stores this information (block 1406).

After the consumer is registered, the identification code service 102 transmits an application 120 to the consumer device (block 1408). In some alternative embodiments, the identification code service 102 may transmit the application 120 before registration, which prompts the consumer to register to enable the application 120 to operate. In these alternative embodiments, a third-party app provider may provide the application 120 instead of the identification code service 120 (or the application 120 may be included within an application of a third-party client).

Some time later, the identification code service 102 receives a message 1409 including identification codes detected by the consumer device 118. The message 1409 may include one identification code or a plurality of identification codes queued by the consumer device 118 and transmitted at a specified time (block 1410). The example identification code service 102 determines content information associated with the received identification code(s) (block 1412). The identification code service 102 also determines whether any of the content information is to be transmitted to the consumer device 118 (block 1414). The identification code service 102 may make the determination based, for example, on a flag specified by a third-party client, the contents of the information, etc. For instance, the identification code service 102 may be programmed to determine that EIDRs and Ad-IDs are not to be transmitted to consumer devices. Alternatively, the identification code service 102 transmits the associated content information to the consumer device 118 responsive to receiving the identification code.

The identification code service 102 transmits content information 1415 to the consumer device 118 that is specified or determined to be for the consumer (block 1416). The identification code service 102 may receive a message 1417 including feedback regarding the processing or execution of the content information 1415 (or the content information 1415 itself) by the consumer device 118. The identification code service 102 stores the feedback as an event (block 1418). The identification code service 102 also stores content information not destined for the consumer device 118 as an event (block 1420). The event may include data such as, for example, the content information, the identification code, and registration information provided by the consumer.

The example identification code service 102 next makes the event(s) (or data associated with the events) available to a third-party client associated with the detected identification codes (block 1422). For example, the identification code service 102 may aggregate data from the events with other data from events associated with the same identification codes (and/or related identification codes with a same or similar identifier), perform statistical analyses on the aggregated data/events, and graphically display the results of the statistical analyses. The identification code service 102 may also publish/transmit a message including the event to a subscribing third-party client. The example process 1400 returns to receiving additional identification codes to further add to the graphical representations of the events.

The example procedure 1450 of FIGS. 14 and 15 operates on the consumer device 118 and/or an application 120 within the consumer device 118. The procedure 1450 begins when the consumer device 118 transmits a request message 1401 to the identification code service 102 (block 1452). In response to transmitting the message 1401, the consumer device 118 receives a message 1403 requesting consumer information. The consumer device 118 receives the information from the consumer and transmits a message 1405 including the consumer information to the identification code service 102 (block 1454). The consumer device 118 then receives and installs application 120 (block 1456).

The example consumer device 118 next receives and plays media content 1355 (block 1458). Additionally or alternatively, the consumer device 118 may sense via a microphone the audio signals of the media content played by another device 119. The application 120 on the consumer device 118 decodes the audio of the media content 1355 (block 1460) and determines whether the audio includes an identification code (block 1462). If the audio does not include an identification code, the application 120 continues to decode media content audio as the audio is detected.

However, if at least one identification code is detected, the application 120 on the consumer device 118 transmits a message 1409 including the detected identification codes to the identification code service 102 (block 1464). In some instances, the application 120 may queue the identification codes until a predetermined time before transmitting. The example application 120 then determines whether content information 1415 has been provided by the identification code service 102 (block 1466). If content information 1415 is received, the application 120 processes the content information for execution by the consumer device 118 (block 1468). This processing and execution can include navigating to a webpage specified by a hyperlink, displaying a promotional code, displaying a description of the media content, playing additional media content, opening an application associated with viewed media content, etc. The application 120 also transmits a message 1417 including feedback regarding the operations performed by the consumer using the content information 1415 (or the content information itself) (block 1470). The example procedure 1450 continues by the consumer device 118 playing additional (or detecting) media content (block 1458). The example procedure 1450 may end when a consumer deletes or removes the application 120 from the consumer device 118.

Processor

Figure 16:
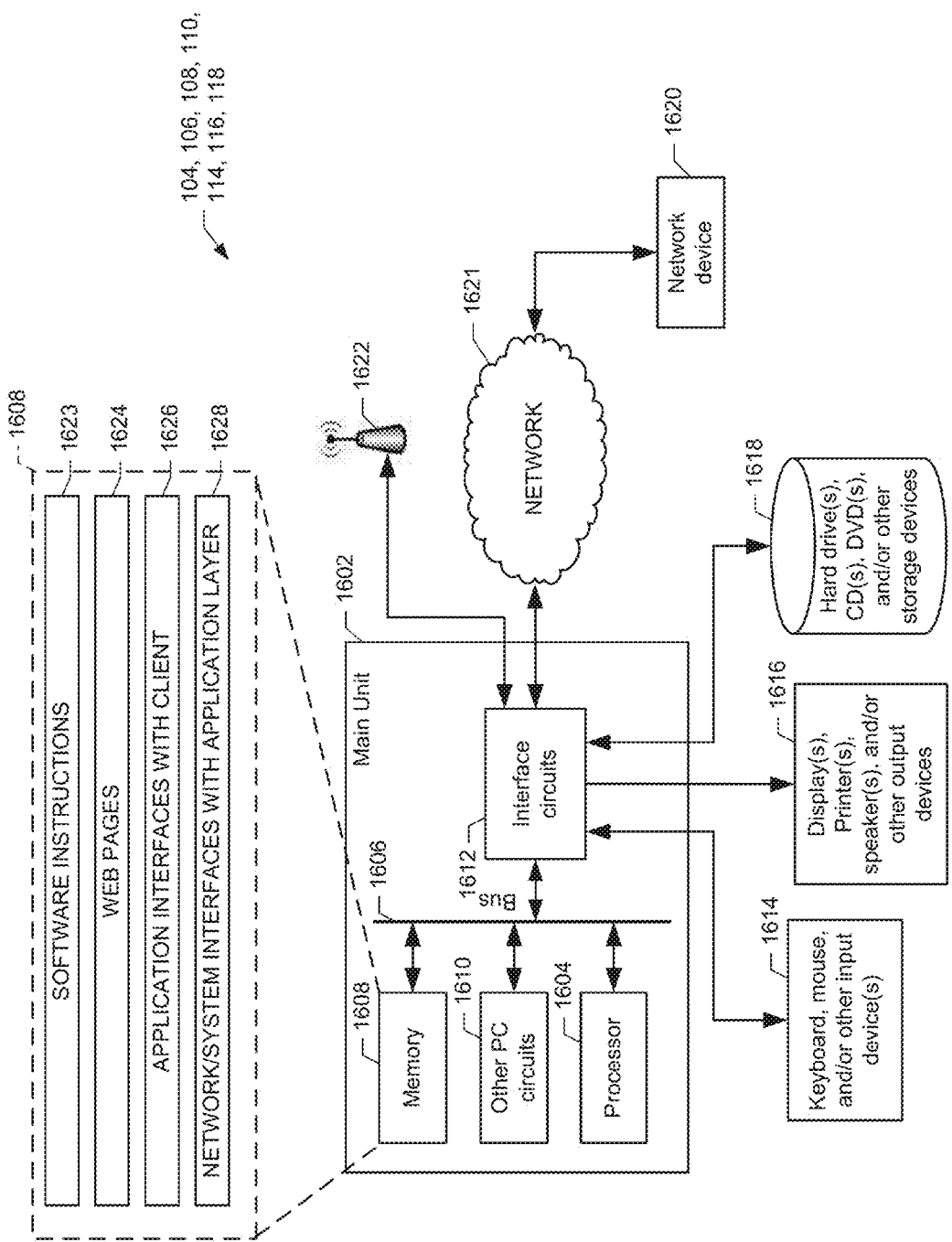
FIG. 16 shows a detailed block diagram of an example identification code generator, an identification code encoder, an identification code manager, an identification code tracker (collectively an identification code service), an embedder, a content provider, and/or a consumer device, according to an example embodiment of the present disclosure.

A detailed block diagram of electrical systems of an example computing device (e.g., an identification code generator 104, an identification code encoder 106, an identification code manager 108, an identification code tracker 110 (collectively an identification code service 102), an embedder 114, a content provider 116, and/or a consumer device 118) is illustrated in FIG. 16. In this example, the devices 102, 104, 106, 108, 110, 114, 116, and/or 118 include a main unit 1602 which preferably includes one or more processors 1604 communicatively coupled by an address/data bus 1606 to one or more memory devices 1608, other computer circuitry 1610, and one or more interface circuits 1612. The processor 1604 may be any suitable processor, such as a microprocessor from the INTEL PENTIUM® or CORE™ family of microprocessors. The memory 1608 preferably includes volatile memory and non-volatile memory. Preferably, the memory 1608 stores a software program that interacts with the other devices in the environment 100, as described above. This program may be executed by the processor 1604 in any suitable manner. In an example embodiment, memory 1608 may be part of a "cloud" such that cloud computing may be utilized by devices 102, 104, 106, 108, 110, 114, 116, and/or 118. The memory 1608 may also store digital data indicative of documents, files, programs, webpages, etc. retrieved from (or loaded via) devices 102, 104, 106, 108, 110, 114, 116, and/or 118.

The example memory devices 1608 store software instructions 1623, webpages 1624, user interface features, permissions, protocols, identification codes, audio files, content information, registration information, event information, and/or configurations. The memory devices 1608 also may store network or system interface features, permissions, protocols, configuration, and/or preference information 1628 for use by the devices 102, 104, 106, 108, 110, 114, 116, and/or 118. It will be appreciated that many other data fields and records may be stored in the memory device 1608 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 1612 may be implemented using any suitable interface standard, such as an Ethernet interface and/or a Universal Serial Bus (USB) interface. One or more input devices 1614 may be connected to the interface circuit 1612 for entering data and commands into the main unit 1602. For example, the input device 1614 may be a keyboard, mouse, touch screen, track pad, track ball, isopoint, image sensor, character recognition, barcode scanner, microphone, and/or a speech or voice recognition system.

One or more displays, printers, speakers, and/or other output devices 1616 may also be connected to the main unit 1602 via the interface circuit 1612. The display may be a cathode ray tube (CRTs), a liquid crystal display (LCD), or any other type of display. The display generates visual displays generated during operation of the device 102, 104, 106, 108, 110, 114, 116, and/or 118. For example, the display may provide a user interface and may display one or more webpages received from a device 102, 104, 106, 108, 110, 114, 116, and/or 118. A user interface may include prompts for human input from a user of the devices 102, 104, 106, 108, 110, 114, 116, and/or 118 including links, buttons, tabs, checkboxes, thumbnails, text fields, drop down boxes, etc., and may provide various outputs in response to the user inputs, such as text, still images, videos, audio, and animations.

One or more storage devices 1618 may also be connected to the main unit 1602 via the interface circuit 1612. For example, a hard drive, CD drive, DVD drive, and/or other storage devices may be connected to the main unit 1602. The storage devices 1618 may store any type of data, such as identifiers, identification codes, registration information, content information, event information, consumer data, media content, image data, video data, audio data, tagging data, historical access or usage data, statistical data, security data, etc., which may be used by the devices 102, 104, 106, 108, 110, 114, 116, and/or 118.

The computing device 102, 104, 106, 108, 110, 114, 116, and/or 118 may also exchange data with other network devices 1620 via a connection to a network 1621 (e.g., the Internet) or a wireless transceiver 1622 connected to the network 1621. Network devices 1620 may include one or more servers, which may be used to store certain types of data, and particularly large volumes of data which may be stored in one or more data repository. A server may process or manage any kind of data including databases, programs, files, libraries, identification codes, content information, consumer registration information, identifiers, consumer data, event information, configuration data, index or tagging data, historical access or usage data, statistical data, security data, etc. A server may store and operate various applications relating to receiving, transmitting, processing, and storing the large volumes of data. It should be appreciated that various configurations of one or more servers may be used to support, maintain, or implement the devices 102, 104, 106, 108, 110, 114, 116, and/or 118 of the environment 100. For example, servers may be operated by various different entities, including content producers, content creators, distributors, broadcasters, service providers, etc. Also, certain data may be stored in one of the devices 102, 104, 106, 108, 110, 114, 116, and/or 118 which is also stored on a server, either temporarily or permanently, for example in memory 1608 or storage device 1618. The network connection may be any type of network connection, such as an Ethernet connection, digital subscriber line (DSL), telephone line, coaxial cable, wireless connection, etc.

Access to a device 102, 104, 106, 108, 110, 114, 116, and/or 118 can be controlled by appropriate security software or security measures. An individual third-party client or consumer's access can be defined by the device 102, 104, 106, 108, 110, 114, 116, and/or 118 and limited to certain data and/or actions. Accordingly, users of the environment 100 may be required to register with one or more computing devices 102, 104, 106, 108, 110, 114, 116, and/or 118.

Conclusion

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
a first server configured to:
receive a request from a third-party client for an identification code; and
determine the identification code including an identifier and a timecode;
a second server configured to:
generate an audio file including the identification code;
receive media content from the third-party client;
embed the audio file into the media content; and
transmit electronically the media content including the embedded identification code to the third-party client; and
a third server configured to:
store, at a first time, first content information in correspondence with a stored copy of the identification code;
replace, at a second time after the first time, the first content information with second content information in correspondence with the stored copy of the identification code;
receive a message, after the second time, including the identification code from a consumer device that detected the identification code within the media content;
determine the identification code corresponds to the second content information; and
transmit the second content information to the consumer device.

2. The apparatus of claim 1, wherein at least one of the first server or the second server is configured to transmit the identification code to the third server, which stores the identification code to a data structure made available to the third-party client.

3. The apparatus of claim 1, wherein the second server is configured to generate the audio file by encoding the identification code into the audio file using coded orthogonal frequency-division multiplexing at a determined frequency band.

4. The apparatus of claim 3, wherein second server determines a first frequency band when the third-party client is a media content distributor and a second frequency band different from the first frequency band when the third-party client is a media content creator.

5. The apparatus of claim 1, wherein:
the first server is configured to:
receive a request from a second third-party client for a second identification code; and
determine a second identification code including a second identifier and a second timecode; and
the second server configured to:
generate a second audio file including the second identification code; and
transmit electronically the second audio file to the second third-party client enabling the second third-party client to embed the second audio file including the second identification code into media content.

6. The apparatus of claim 5, wherein the third-party client is a creator of the media content and the second third-party client is a distributor of the media content downstream from the creator.

7. The apparatus of claim 5, wherein the second third-party client embeds the second identification code in the media content by (i) identifying the identification code within the media content, (ii) removing the identification code from the media content, and (iii) adding the second identification code to the media content in place of the first identification code.

8. The apparatus of claim 5, wherein:
the first server configured to:
receive a second request from the third-party client for a second identification code; and
determine the second identification code including a second identifier and a second timecode; and
the second server is configured to:
generate the audio file including the identification code within a first time period and the second identification code within a second time period after the first time period; and
transmit electronically the audio file to the third-party client enabling the third-party client to embed the audio file including the identification code and the second identification code into the media content.

9. The apparatus of claim 1, wherein the first content information includes an Entertainment Identifier Registry and the second content information includes metadata to be transmitted to the consumer device that detects the identification code.

10. A method comprising:
determining, via a first processor, an identification code responsive to a request from a third-party client;
generating, via the first processor, an audio file including the identification code;
transmitting, via the first processor, the audio file to the third-party client enabling the third-party client to embed the audio file including the identification code into media content;
causing a second processor to store a copy of the identification code to a data structure accessible by the third-party client;
receiving, via the second processor, first content information associated with the media content from the third-party client;
storing at a first time, via the second processor, the first content information in correspondence to the stored copy of the identification code;
replace, at a second time after the first time, the first content information with second content information in correspondence to the stored copy of the identification code;
receiving, via the second processor after the second time, a message including the identification code from a consumer device that detected the identification code within the media content;

selecting, via the second processor, the second content information corresponding to the identification code; and transmitting, via the second processor, the second content information to the consumer device.

11. The method of claim 10, further comprising:

receiving, via the second processor before the second time, a prior message including the identification code from the consumer device or a different consumer device that detected the identification code within the media content;

selecting, via the second processor, the first content information corresponding to the identification code; and transmitting, via the second processor, the first content information to the consumer device or the different consumer device.

12. The method of claim 10, wherein at least one of the first content information and the second content information includes at least one of an Entertainment Identifier Registry ("EIDR"), an Ad-ID, metadata, an electronic file, an advertisement, a promotion, and a hyperlink associated with the media content.

13. The method of claim 10, wherein the audio file includes a pulse-code modulated WAV file.

14. The method of claim 10, wherein generating the audio file includes:

setting a duration during which the identification code is to be repeated within the audio file based on a first time specified by the third party-client, setting an offset of the identification code within the audio file based on a second time specified by the third-party client, and modulating the identification code in a frequency band based on a channel specified by the third-party client.

15. The method of claim 10, wherein the identification code includes a 48-bit identifier and an 18 bit timecode.

16. The method of claim 15, wherein the identifier is selected from among a sub-set of identifiers available to the processor.

17. An apparatus comprising:

a server configured to:

receive a copy of an identification code from an identification code generator, the identification code being embedded into media content by a third-party client;

receive, at a first time, first content information associated with the media content from the third-party client;

store the first content information in conjunction with the copy of the identification code to a data structure accessible by the third-party client;

receive, at a subsequent second time, second content information associated with the media content;

replace the first content information with the second content information stored in conjunction with the copy of the identification code;

receive from a consumer device, after the second time, a message including the identification code;

determine the identification code included within the message corresponds to the copy of the identification code that is stored to the data structure;

select the second content information, stored to the data structure, that is associated with the copy of the identification code; and transmit the second content information to the consumer device.

18. The apparatus of claim 17, wherein the server is configured to:

receive the second content information associated with the media content from at least one of the third-party or a different third-party.

19. The apparatus of claim 17, wherein the server is configured to replace the first content information with the second content information after a condition is satisfied.

20. The apparatus of claim 19, wherein the second content information transmitted to the consumer device includes at least one of an advertisement, a promotion, a hyperlink, and metadata associated with the media content.

21. The apparatus of claim 1, wherein the first content information includes at least one of a first Entertainment Identifier Registry ("EIDR"), a first Ad-ID, first metadata, a first electronic file, a first advertisement, a first promotion, and a first hyperlink associated with the media content and the second content information includes at least one of a second EIDR, a second Ad-ID, second metadata, a second electronic file, a second advertisement, a second promotion, and a second hyperlink associated with the media content.

* * * * *